United States Patent [19]

Kuraoka et al.

[11] Patent Number: 4,774,667
[45] Date of Patent: Sep. 27, 1988

[54] BRAKE CONTROL SYSTEM FOR VEHICLE

[75] Inventors: Hiroaki Kuraoka, Oobu; Naoto Ohoka, Toyohashi; Hideaki Namba, Oobu; Eiichi Kamei, Nagoya; Masahiro Ohba, Okazaki; Nobuhiko Makino, Kariya, all of Japan

[73] Assignee: Nippondenso Co., Ltd., Kariya, Japan

[21] Appl. No.: 847,924

[22] Filed: Apr. 3, 1986

[30] Foreign Application Priority Data

Apr. 4, 1985 [JP] Japan ................... 60-72423
Jun. 7, 1985 [JP] Japan ................. 60-124927
Jun. 21, 1985 [JP] Japan ................. 60-136595

[51] Int. Cl.$^4$ ............................................. B60T 8/66
[52] U.S. Cl. ........................ 364/426.02; 364/150; 364/148; 303/103; 303/109
[58] Field of Search ............... 364/149, 150, 805, 578, 364/426, 148; 303/20, 103, 109, 92–95

[56] References Cited

U.S. PATENT DOCUMENTS

| | | | |
|---|---|---|---|
| 3,912,340 | 10/1975 | Bertolasi | 303/109 X |
| 4,080,654 | 3/1978 | Walley, Jr. | 364/805 X |
| 4,123,116 | 10/1978 | Carp et al. | 303/103 |
| 4,460,963 | 7/1984 | Leiber et al. | 364/426 |
| 4,663,703 | 5/1987 | Axelby et al. | 364/150 |
| 4,669,058 | 5/1987 | Schreider et al. | 364/148 |
| 4,671,579 | 6/1987 | Sawano et al. | 303/95 |

FOREIGN PATENT DOCUMENTS 0064586 5/1977 Japan ..................... 303/109

Primary Examiner—Parshotam S. Lall
Assistant Examiner—Thomas G. Black
Attorney, Agent, or Firm—Cushman, Darby & Cushman

[57] ABSTRACT

Disclosed is a brake control system for a motor vehicle comprising a wheel braking device (M5) for providing the braking of a wheel of the vehicle in accordance with pressure, a braking pressure adjusting device (M6) for adjusting the braking pressure applied to the wheel braking device (M5), a detector (M4) for detecting a rotational state of the wheel, a rotational state setting device (M8) for setting an optimally rotational state of the wheel in according with an operating condition of the vehicle, and a control unit (M9) for feedback-controlling the braking pressure adjusting device (M6) so that the detected rotational state is equal to the set rotational state.

The control unit (M9) is constructed as an integral-added optimal regulator which controls the braking pressure adjusting device (M6) on the basis of an optimal feedback gain predetermined in accordance with a dynamic model of a system relating to the brake of the vehicle.

The brake control system with such an arrangement makes possible to provide quick response and high stability on the braking operation of the vehicle.

17 Claims, 18 Drawing Sheets

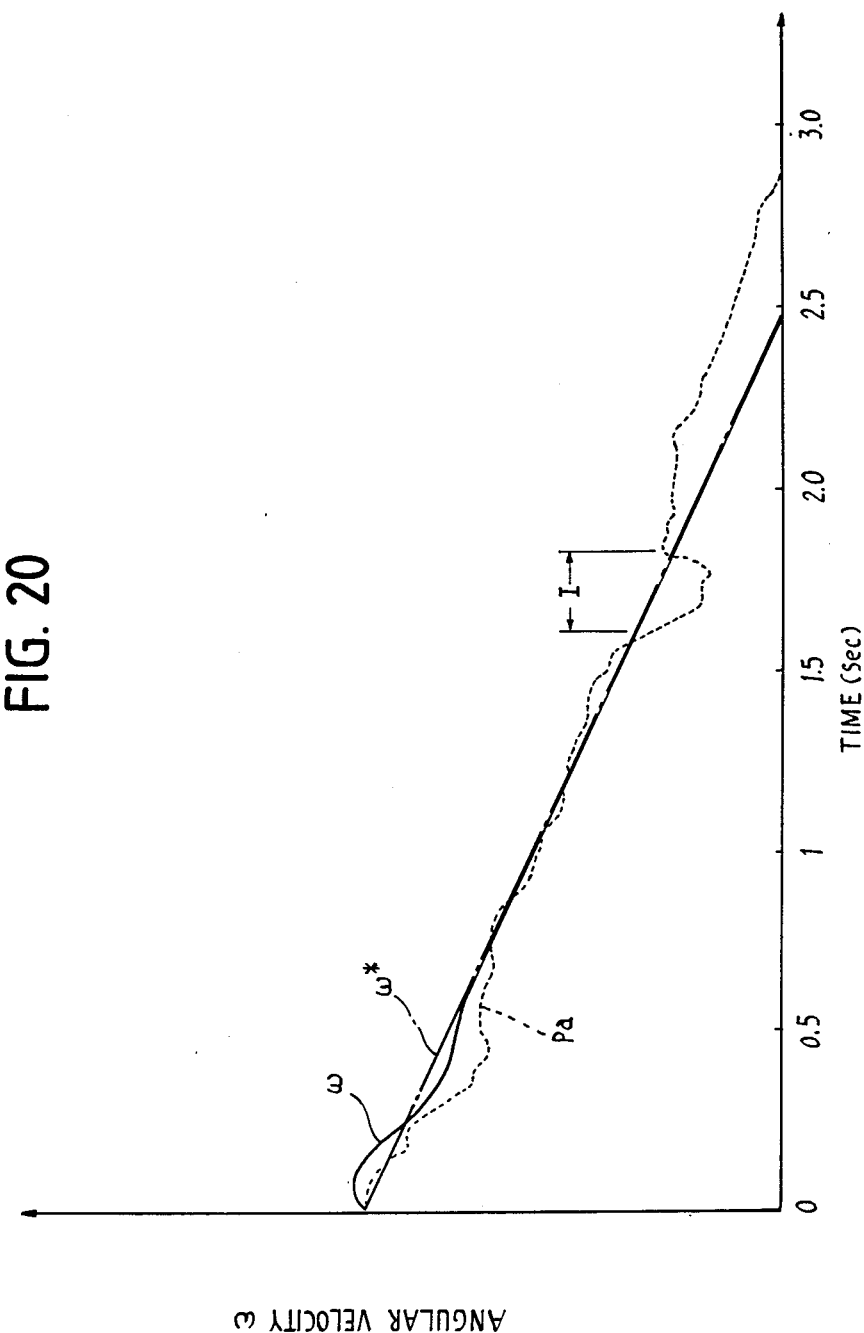

BRAKE CONTROL SYSTEM FOR VEHICLE

BACKGROUND OF THE INVENTION

The present invention relates to a brake control system for use in a vehicle, more particularly to such a brake control system for a vehicle, which optimally controls the braking pressure on the braking operation of the vehicle on the basis of a dynamic model of a system relating to the brake of the vehicle.

Anti-skid control systems are known as systems for controlling the speed of each of wheels of a motor vehicle to maximize the frictional force between a tire and a road surface by causing the slip ratio SL [(vehicle speed—wheel rotational speed)/vehicle speed]to be controlled to assume 15 to 20%, with a view to preventing the vehicle from resulting in suffering decrease in safety due to locking of the wheels on vehicle braking operation, i.e., disabling of control of the vehicle, and from hip-swinging (skid) due to the locking of the wheels. One of example of such a system is disclosed in Japanese Provisional Publication No. 58-122248.

In anti-skid control systems of this type, to maximize the frictional force between the tire and road surface and allow the vehicle to quickly stop without causing the locking of the wheels, the rotational speed of each of the wheels is compared with a reference speed V derived on the basis of a vehicle speed Vs, i.e., given by V=Vs (1−SL) where SL represents slip ratio (0.15 to 0.2), and the braking hydraulic pressure is controlled so that the rotational speed of the wheel becomes equal to the reference speed. That is, with reference to FIG. 2, when the rotational speed V1 of the wheel is below the reference speed V, control is performed to decrease the braking pressure applied to the wheel, and when it exceeds the reference speed V thereafter, control is effected to increase the same. This braking pressure control is repeatedly performed, whereby the rotational speed of the wheel becomes closer to the reference speed V.

The brake of the wheel is normally achieved by applying braking hydraulic pressure generated under control to wheel braking cylinders so that the force corresponding to the braking hydraulic pressure is provided to braking members such as brake shoe and disc. Therefore, in the conventional brake control systems such as anti-skid control system, the control of the braking force has been performed by providing a hydraulic pressure adjusting device for the increasing, decreasing and maintaining of the hydraulic pressure in the hydraulic pressure system between a master cylinder operatively associated with a brake pedal of the vehicle for generating the hydraulic pressure and the wheel braking cylinders for directly controlling the braking members.

However, such conventional anti-skid control systems are arranged to individually control the rotational speeds of the respective wheels by controlling the braking hydraulic pressures to the respective wheels on the basis of so-called classic feedback control theory and therefore there arises problems that the lateral slippage of the vehicle occurs due to the unbalance of control caused by, for example, discrepancy in terms of abrasion between the tires of the wheels and difficulty is encountered to quickly stop the vehicle. Furthermore, with respect to each of the wheels, the conventional anti-skid control systems only makes possible to bring the rotational speed of the wheel approximately close to the reference speed due to the difficulty to be controlled so that the rotational speed is coincident with the reference speed and thus makes impossible to minimize the braking distance In addition, the conventional brake control systems for vehicles have encountered the following probems, for which improvements should be required seriously.

(1) Control is performed to decrease the braking hydraulic pressure in response to the determination on the occurrence of the locking of the wheel, while control is effected to increase the braking hydraulic pressure in response to the requirement of the braking force due to the releasing of the locking. However, a dead time (response time lag) necessarily exists with such control performed through the hydraulic pressure system. Since it is impossible to detect the dead time, in the conventional vehicle brake control systems, the braking hydraulic pressure has been feedback controlled on the basis of the slip ratio of the wheel or the rotational angle speed thereof (controlled object), resulting in the occurrence of excessive control. That is, this causes the worsening of the drive feeling with overshoot and undershoot of the braking hydraulic pressure repeated during the anti-skid control for the vehicle.

(2) When the control of the braking hydraulic pressure is relaxed to eliminate the problem in terms of the excessive control with a view to ensuring fine drivability and drive feeling, there arises a problem in connection with the braking characteristics. This means that the braking distance would be made longer because difficulty is encountered to optimally control the slip ratio.

These problems (1) and (2) appear in the case that the pressure-decreasing of the braking hydraulic pressure is performed by varying the volume relating to a pressure-decreasing piston provided in the hydraulic pressure system, and when the control of the braking hydraulic pressure is effected by the valve opening/closing operations of an actuator such as solenoid-operated valve provided additionally, there would arise a problem associated with, particularly, dead time on control.

SUMMARY OF THE INVENTION

The present invention has been developed in order to eliminate the above-described disadvantages inherent in the prior art brake control systems.

It is therefore an object of the present invention is to provide a new and improved brake control system for vehicles which is capable of providing quick response, high stability and high accuracy in braking operation by controlling the braking pressures applied to the respective wheels based on so called modern control theory.

More specifically, the present invention provides a brake control system which is capable of controlling the braking pressure so that the rotational speed of the vehicle wheel assumes an optimal value to minimize the braking distance and so that the brake is effected with an optimal slip ratio of the wheel without causing the excessive control due to the dead time on the hydraulic pressure system for braking operation.

A brake control system of the present invention developed for motor vehicles for eliminating the above-described problems and achieving the above-metioned objects, basically comprises: wheel braking means for providing the braking of a wheel of the vehicle in accordance with pressure; braking pressure adjusting means for adjusting the braking pressure applied to the wheel braking means; detector means for detecting rotational state of the wheel; rotational state setting means for setting an optimally rotational state of the wheel in accordance with an operating condition of the vehicle; and control means for feedback-controlling the braking pressure adjusting means so that the detected rotational state is equal to the set rotational state.

According to a feature of the present invention, the controlling means is constructed as an integral-added optimal regulator which controls the braking pressure adjusting means on the basis of an optimal feedback gain predetermined in accordance with a dynamic model of a system relating to the brake of the vehicle.

In accordance with the present invention, there is provided a brake control system for a vehicle comprising: vehicle speed detecting means for detecting a speed of said vehicle; rotational speed detecting means for detecting a rotational speed of a wheel of said vehicle; braking pressure adjusting means for adjusting a braking pressure transfered to a braking device for braking said wheel; slip ratio setting means for setting a slip ratio of said wheel in accordance with the operating amount of a brake pedal of said vehicle; target rotational speed setting means for setting a target rotational speed for said wheel on the basis of the set slip ratio and the detected vehicle speed; and brake controlling means for controlling said braking pressure adjusting means so that the detected rotational speed of said wheel is equal to the set target rotational speed, said brake controlling means being constructed as an integral-added optimal regulator which determines the braking pressure to said braking member on the basis of an optimal feedback gain predetermined in accordance with a dynamic model of a system relating to brake of said vehicle.

In accordance with the present invention, there is also provided a brake control system for a vehicle, comprising: braking pressure adjusting means for adjusting a braking pressure transfered through a hydraulic pressure system to a braking device for braking a wheel of said vehicle; slip ratio detecting means for detecting a slip ratio of said wheel of said vehicle; target slip ratio setting means for setting a slip ratio of said wheel so as to make a friction force between said wheel and a road surface to a maximum; and brake controlling means for feedback-controlling said braking pressure adjusting means feedback-controlling said braking pressure so that the detected slip ratio of said wheel is equal to the set target slip ratio, said brake controlling means having state variable determining means for determining state variables representing the internal state of a system performing the brake of said wheel including a variable corresponding to a dead time on control of said hydraulic pressure system, and said brake controlling means being constructed as an integral-added optimal regulator for performing the feedback control by determining a control amount for said braking pressure adjusting means on the basis of the detected slip ratio, the determined state variables, and an optimal feedback gain predetermined in accordance with a dynamic model of a system performing the brake of said wheel.

In accordance with the present invention, there is further provided a brake control system for a vehicle comprising: braking pressure adjusting means for adjusting a braking pressure transfered through a hydraulic pressure system to a braking device for braking a wheel of said vehicle; wheel speed detecting means for detecting a wheel speed of said wheel; vehicle speed detecting means for detecting a speed of said vehicle; and control means for determining a target wheel speed on the basis of the detected vehicle speed and for feedback-controlling said braking pressure adjusting means so that the detected wheel speep is equal to the determined target wheel speed, said control means having state variable determining means for determining state variables representing tne internal state of a system performing the brake of said wheel including a variable corresponding to a dead time on control of said hydraulic pressure system, and said control means being constructed as an integral-added optimal regulator for performing the feedback control by determining a control amount for said braking pressure adjusting means on the basis of the detected wheel speed, the determined target wheel speed, the determined state variables, and an optimal feedback gain predetermined in accordance with a dynamic model of a system performing the brake of said wheel.

BRIEF DESCRIPTION OF THE DRAWINGS

The object and features of the present invention will become more readily apparent from the following detailed description of the preferred embodiments taken in conjunction with the accompanying drawings in which:

FIG. 20 is a graph showing wheel speed control according to the third embodiment in comparison with a conventional technique.

DETAILED DESCRIPTION OF THE INVENTION

Figure 1:
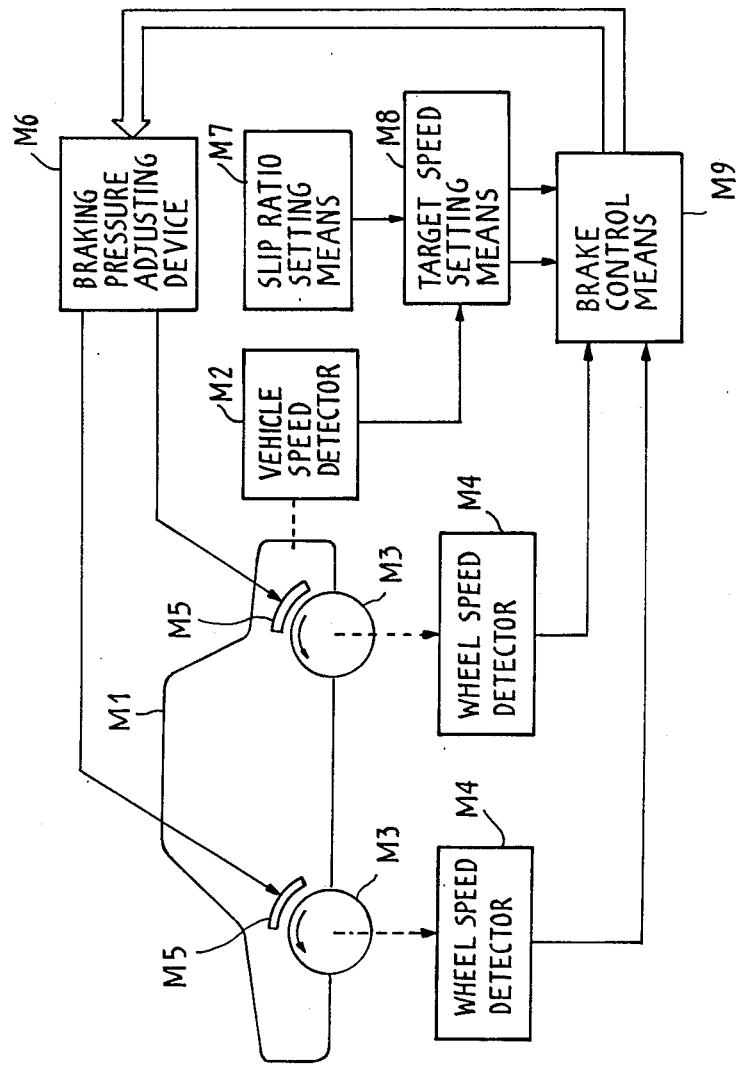
FIG. 1 is a schematic block diagram illustrating a brake control system according to a first embodiment of the present invention which is adapted for a motor vehicle.
Figure 2:
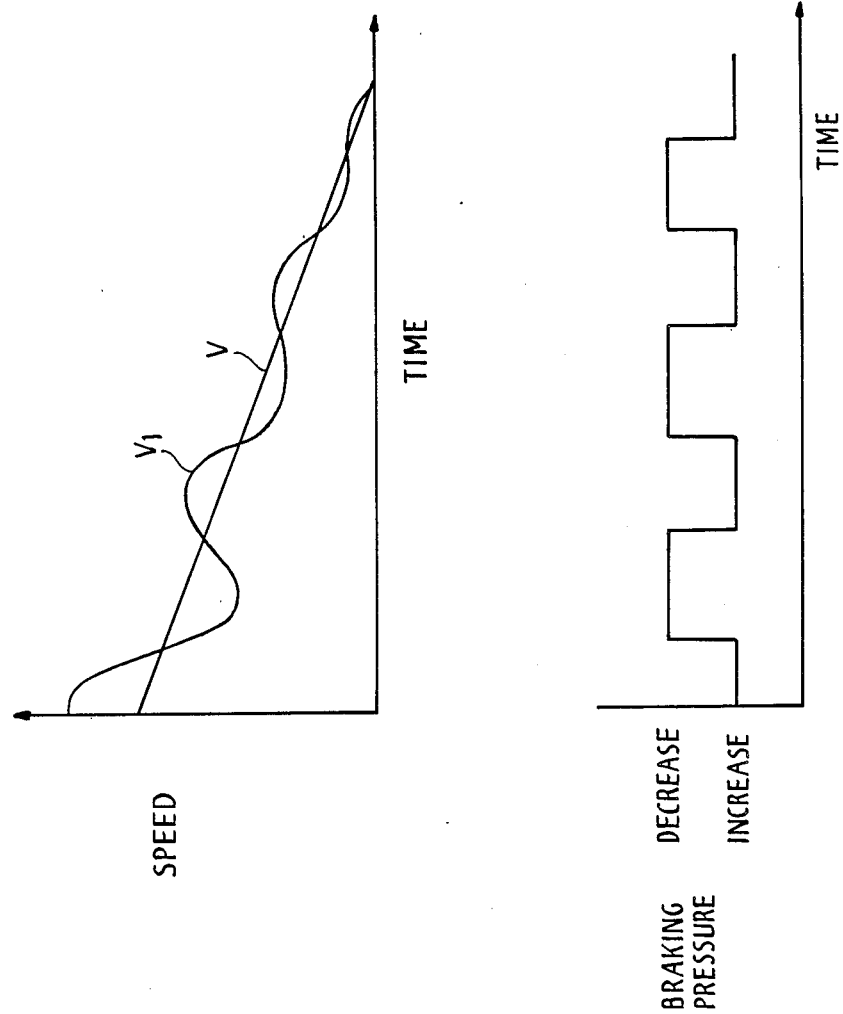
FIG. 2 is a timing chart useful for describing the operation of a conventional anti-skid control system.

Referring now to FIG. 1, there is schematically illustrated a brake control system according to an embodiment of the present invention which is adapted for a motor vehicle M1. Illustrated at the reference M2 is vehicle speed detecting means which is arranged to allow a vehicle speed to be detected at least at the time of braking operation of the motor vehicle M1 and, for example, arranged to derive the vehicle speed on the vehicle braking operation from the calculation based on the vehicle speed immediately before the vehicle braking operation, obtained by a vehicle speed sensor generally mounted on vehicles or obtained using a rotational speed sensor employed for the rotational speed detecting means M4 which will be described hereinafter, and the deceleration of the vehicle obtained on the vehicle braking operation using an acceleration sensor. It is also appropriate that a speed meter is used which directly detects a speed of the vehicle with respect to the ground, i.e., a vehicle speed, with the utilization of Doppler effect. As the acceleration sensor for detecting the deceleration, for example, is adopted a gas rate acceleration sensor or a sensor using Coriolis force.

The above-mentioned rotational speed detecting means M4 is provided for each of the wheels M3 of the vehicle M1 for detecting rotational speeds of the respective wheels M3, and, for example, is arranged to detect the rotational speed of the drive shaft of the wheels using a generator type rotational speed sensor, a Hall generator type rotational speed sensor, or a photoelectric rotational speed sensor. Braking devices M5 are means for providing the brake to the wheels M3, each being provided for each of the vehicle wheels M3 and having a wheel braking cylinder. Conventional braking devices such as hydraulic pressure brake device driven under hydraulic pressure and air braking device driven under gas pressure can be employed therefor. The braking pressure is controlled by the braking pressure adjusting means M6.

Slip ratio setting means M7 is arranged to determine the slip ratio of the wheel in accordance with the operating amount or stepping-into condition of a brake pedal of the vehicle M1, for example. More specifically, when the stepping-into amount of the brake pedal is greater, determination is made wherein the vehicle driver requires a great braking force, whereby the slip ratio is set to 15 to 20% so that the vehicle M1 is stopped to take a minimum stopping distance. On the other hand, when the stepping amount thereof is smaller, determination is made wherein the driver requires a gentle decrease of vehicle speed, whereby the slip ratio is set to a small value, for example, 5%.

Target rotational speed setting means M8 establishes a target rotational speed of each of the wheels M3 on the basis of the set slip ratio and the vehicle speed.

Brake controlling means M9 is responsive to signals from the rotational speed detecting means M4 provided at each the wheel M3 and adjusts the braking pressure for each the wheel by outputting a control signal to the braking pressure adjusting member M6 so that the rotational speed of each of the wheels M3 is equal to the corresponding target rotational speed set by the target rotational speed setting means M8. The braking pressure adjustment is achieved by using a microcomputer having a microprocessor and its associated units such as read-only memory (ROM), random access memory (RAM), input/output circuits and so on. Unlike the control circuit employed for the conventional anti-skid control, the brake controlling means M9 according to the present invention determines the braking pressure to each of the braking devices M5 on the basis of an optimal feedback gain F predetermined in accordance with dynamic model of a system relating to the brake of the vehicle and then supply a control signal indicative of the determined braking pressure to the braking pressure adjusting means M6.

More specifically, the brake controlling means M9 is constructed as an integral-added regulator ror determining an optimal control amount on the basis of the target rotational speed of each of the wheels set by the target rotational speed setting means M8 and the actual rotational speed detected by the rotational speed detecting means M4.

A method of constituting such integral-added optimal regulator is described in detail in documents, such as "Linear System Control Theory" written by Katsuhisa Furuta published by Shokodo Japan in 1976. An outlook for the method of actually forming such regulator will be given hereinbelow. In the following description, the references vectors (matrix), a superscript $T$ such as $A^T$ indicating F , X , A , B , C , y , u , L , G , Q , R , T , P indicate vectors (matrix), a superscript $T$ such as $A^T$ indicating transposed matrix, a supercript $-1$ such as $A^{-1}$ indicating inverse matrix, a symbol $\hat{}$ such as $\hat{X}$ indicating an estimate, a symbol $-$ such as $\overline{C}$ indicating an amount handled by another system, i.e. a state observer (which will be simply referred to as observer hereinafter) which amount is generated by way of transformation or the like from the system relating to a controlled object, a symbol* such as y* indicating a target value, respectively.

It is known in modern control theory that in a control of a controlled object, i.e. the vehicle brake control in this case, the dynamic behavior of the controlled object is described in discrete-time system as:

$$X(k) = A \cdot X(k-1) + B \cdot u(k-1) \tag{1}$$

$$y(k) = C \cdot X(k) \tag{2}$$

The above Eq. (1) is called a state equation, and Eq. (2) is called an output equation, and a term X (k) indicates state variables which represent the internal state of the system relating to the brake of a vehicle, a term u (k) indicates control input variables for a controlled object, for example, vectors comprising the braking pressures to the respective wheels M3 controlled by the braking pressure adusting member M6, and a term y (k) indicates control output variables of the controlled object, for example, vectors comprising the rotational speeds of each the wheel M3 detected by the rotational speed detecting means M4. The Eqs. (1) and (2) are both described in discrete-time system, and a subscript "k" indicates that the value is of the present time, while a subscript "k−1" indicates that the value is of the sampling time immediately preceding the present time.

The state variables X (k) indicating the internal state of the vehicle brake system represents information relating to the history of the system which is necessary and sufficient for predicting the influence in future in the control system. Therefore, the dynamic model of the system relating to the brake of the vehicle will be clear, and if we can determine vector quantities A , B and C of Eqs. (1) and (2), then it is possible to optimally control the operation of the vehicle brake using the state variables X (k). In a servo system, while the system has to be expanded, this will be described hereinlater.

However, it is difficult to accurately theoretically obtain dynamic models of a complex objective such as brake control of a vehicle, because the model cannot be linearly obtained for the overall control range, and therefore, it is necessary to obtain the same through experiments. This is a method of constructing a model, which method is so called system identification, and where the vehicle is controlled under a predetermined condition in terms of brake, the model is constructed according to state equation (1) and output equation (2) with which linear approximation is satisfied around the predetermined state. Therefore, even in the case that the dynamic model related to the operation of the brake of the vehicle is of nonlinear, linear approximation can be performed by dividing the operating range into a plurality of normal operating states, and therefore it is possible to determine each dynamic model.

If the controlled object, such as monocycle, is of a sort that a physical model can be relatively easily constructed, then the model (i.e. vectors A , B , and C ) of a dynamic system can be determined through system identification which can be made through a method such as frequency response method or spectrum analysis. However, in the case of controlled object of multidimentional system having a plurality of wheels such as a motor vehicle, it is difficult to make a physical model which is accurately approximated, and in such a case, dynamic model is constructed through least square method, instrumental variable method or on-line identification. Furthermore, the transient response method will be employed for the construction of approximation model for the dead time of the control ststem and the like.

Once a dynamic model is determined, an amount of feedback is determined from the state variables X (k), the rotational speeds y (k) of the respective wheels M3 and its target rotational speeds y*(k) (in the other embodiment, for example, slip ratio and target slip ratio), so that controlled variables u (k) of the condition for the driving of the braking pressure adjusting member M6 for controlling the braking pressure to each of the wheels are theoretically and optimally determined. Normally, in a control system for the braking of vehicle, variables directly influencing on the braking operation of the vehicle, such as loads applied to the respective wheels, acceleration, transferring speed of oil or gas delivered to the braking member M5 and the dynamic behaviour of the braking device M5, may be treated as the state variables X (k). However, most of such variables are difficult to be directly measured. Therefore, in this case, means called state observer (observer) is formed within the brake controlling means M9 so that it is possible to estimate the state variables X (k) of the vehicle, for example, using the braking pressure to each the wheel and rhe detection signal (actual rotational speed) from the rotational speed detecting means M4. This is the observer according to modern control theory, and various types of observer and their designing methods are known. These are described in detail, for instance, in "Mechanical System Control" written by Katsuhisa Furuta, published from Ohm Co. Ltd. in 1984, and the observer may be designed as a minimal order observer or a finite time settling observer in correspondence with the fashion of an applied controlled object, i.e. the vehicle and the brake control system.

The brake controlling means M9 controls the braking pressure adjusting means M6, in a system expanded using an accumulated value obtained by accumulating the difference between the target rotational speed of eacn the wheel and the actual rotational speed detected by the rotational speed detecting means M4, by determining an optimal feedback amount using both the measured or estimated state variables X (k) and further a predetermined optimal feedback gain. The accumulated value is a value which is necessary since the target rotational speed to be set varies depending on the vehicle speed and demand in terms of the brake by a vehicle driver. In control of a servo system, it is required generally to perform control for cancelling the steady-state error between tne target value and an actual controlled variable, and this corresponds to the necessity of inclusion of $1/S^l$ (integration of $l^{th}$ order) in a transfer function. In the case that a state equation is made with the transfer function of the sytem being determined through system identification as described in the above, it is preferable to include such integrated amount in view of stability against noise. Therefore, when the accumulated value is introduced into the above-mentioned state variable X (k) to expand the system so as to determine the feedback amount from these values and a predetermined optimal feedback gain F, the controlled variable to the controlled object, i.e. the braking pressures to the respective wheels are determined as an integral-added optimal regulator.

Nextly, it will be described with respect to the optimal feedback gain. In an optimal regulator to which an integral element is added as described in the above, the way of finding a control input (the variables of the braking pressure of each the braking member M5 in this case) which minimizes a performance function J is made clear, while it is also known that the optimal feedback gain can be obtained from a solution of Riccati equation, A, B, C matrixes of the state equation (1) and the output equation (2), and the weighted parameter used in performance index (see the above-mentioned book). In the above, the weighted parameter is initially arbitrarily given so as to change the weighting in the regulation of the behavior of the braking hydraulic pressure of the system performing brake control of the vehicle by the performance index J. It is possible to determine an optimal value through repetition of simulation by changing the weighted parameter by a given amount from the behavior of the braking hydraulic pressure which are obtained as the result of siumulation performed by a large computer with an arbitrary weighted parameter being given. As a result, an optimal feedback gain F is also determined.

Therefore, the brake controlling means M9 of the brake control system according to the present invention is formed as an integral-added optimal regulator using a dynamic model of the system relating to the brake of the vehicle which dynamic model is determined in advance through system identification, and the parameter of the observer therein and an optimal feedback gain F and so on are determined in advance through simulation using the internal combustion engine M1.

While it has been described that the state variable X (k) is an amount indicating the internal state of the vehicle, this is not required to be a variable corresponding to actual physical amount, and therefore, this may be designed as a vector quantity of an appropriate order which is suitable for indicating the state of the vehicle.

Figure 3:
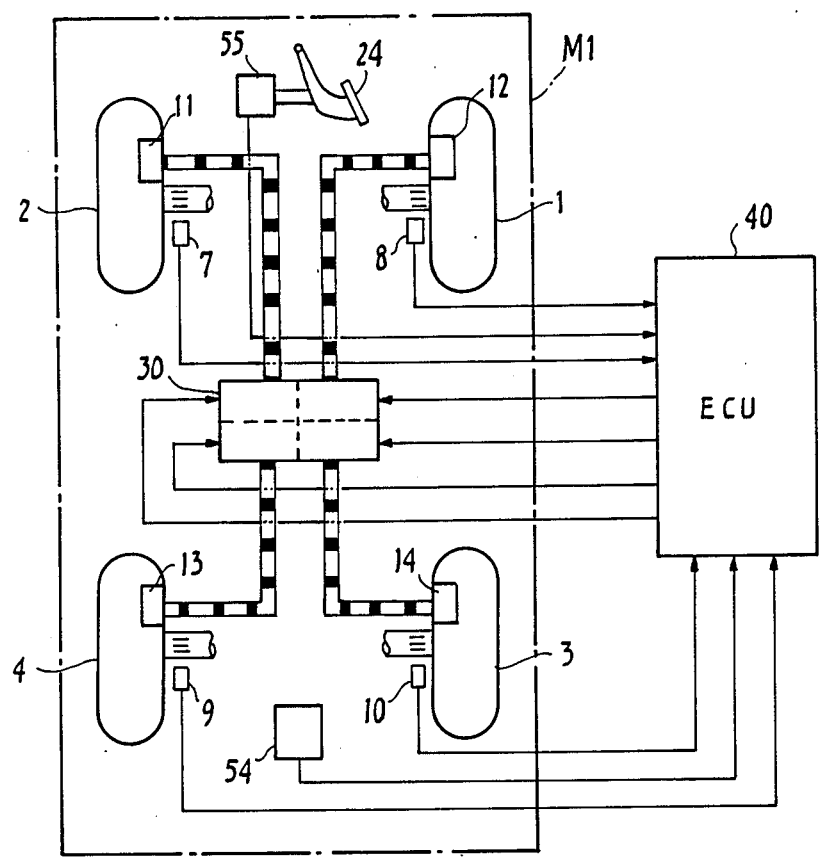
FIG. 3 is a diagram showing the brake control system according to the first embodiment of the present invention incorporated with a brake system of a motor vehicle.

The first embodiment of the present invention will be hereinbelow described in detail with reference to the diagram illustrating the brake control system according top drawings. Of the drawings, FIGS. 3 is a schematic block the present invention incorporated with a brake system of a motor vehicle.

In the figure, the reference numeral M1 represents a vehicle, each of the wheels 1 to 4 of which is equipped with each of electromagnetic pickup type rotational speed sensors 7 to 10. The rotational speed sensors 7 through 10 correspond to the rotational speed detecting means M4. Each of the wheels 1 through 4 is provided with hydraulic pressure braking devices 11 through 14 which are means for directly braking each the wheel under hydraulic pressure and which correspond to the braking devices M5, and the rotations of the wheels 1 to 4 is braked by the braking devices 11 to 14 operated under the braking hydraulic pressure developed through a braking hydraulic pressure generating device 30 (which will be hereinafter referred to as actuator). The reference numeral 55 designates a stepping amount sensor for sensing the stepping-into amount of a brake pedal 24 and numeral 54 depicts an acceleration sensor for detecting the acceleration and deceleration of the vehicle M1. Detection signals from the respective sensors are inputted to an elecronic control unit (ECU) 40, and the control unit 40 calculates an optimal braking hydraulic pressure to each of the braking devices 11 through 14 for the vehicle braking operation on the basis of the detection signals and outputs a control signal to the actuator 30.

The wheels 1 through 4 respectively represent front-right wheel (FR), front-left wheel (FL), rear-right wheel (RR), and rear-left wheel (RL), and the rotational speeds of the wheels 1 to 4 detected by the rotational speed sensors 7 to 10 are respectively designated by the reference characters Vfr, Vfl, Vrr, and Vrl.

Figure 4:
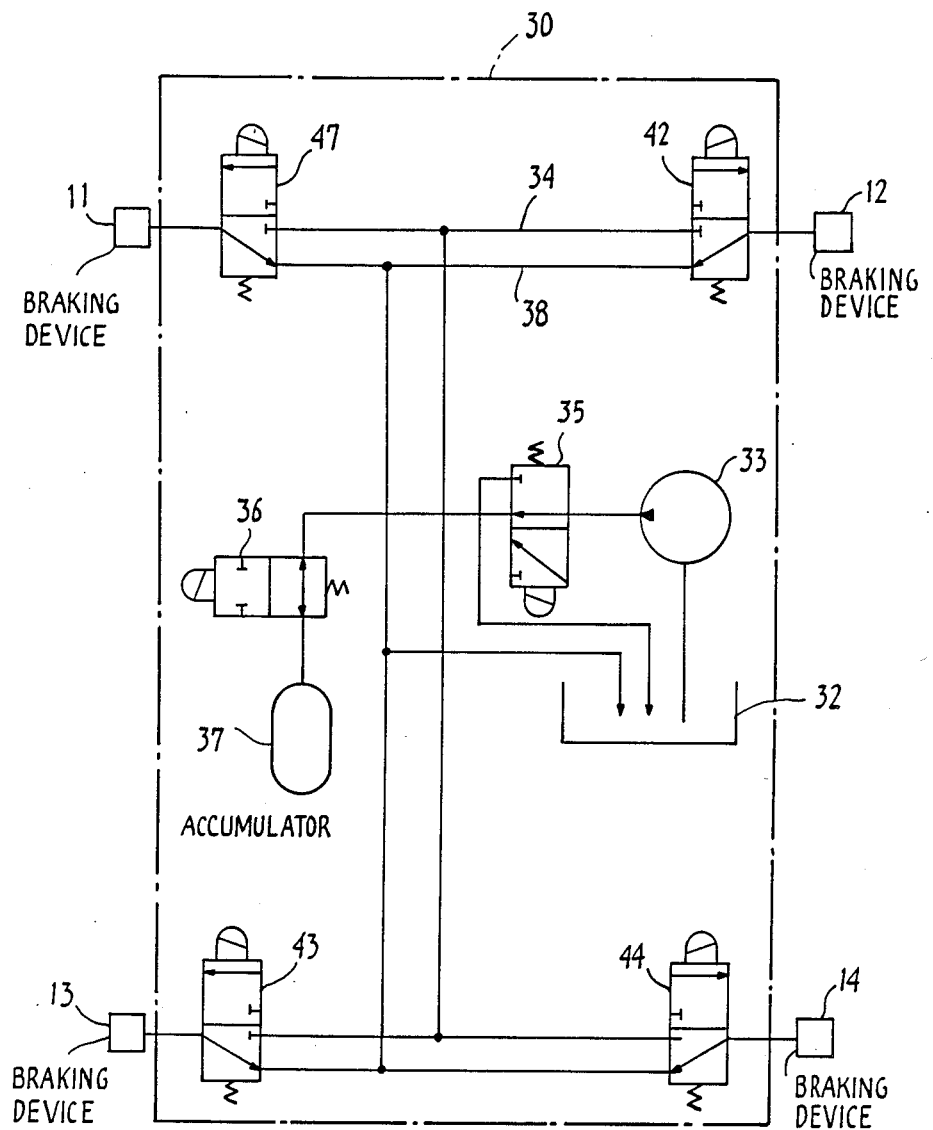
FIG. 4 is an illustration of an actuator of a brake system of a motor vehicle.

The actuator 30, corresponding to the braking hydraulic pressure adjusting member M6, can be arranged as shown in FIG. 4. That is, the actuator 30 comprises a hydraulic pressure pump 33 for pumping oil stored in a reservoir 32, an adjusting valve 35 for supplying the oil pumped by the hydraulic pressure pump to an oil supplying pipe 34 and for adjusting the hydraulic pressure within the oil supplying pipe 34, an accumulator 37 coupled through a normal-opened solenoid-operated valve 36 to the oil supplying pipe for preventing the ripple of oil in the oil supplying pipe 34, and electromagnetic directional control valves 41 through 44 for delivering the oil within the oil supplying pipe 34 to each the hydraulic pressure braking devices 11 through 14 and adjusting the braking pressure thereto by returning the oil from the braking devices 11 to 14 through an oil returning pipe 38 to the reservoir 32. Therefore, the hydraulic pressure within the oil supplying pipe 34 is always maintained to a predetermined hydraulic pressure and the pressure within the oil returning pipe 38 becomes equal to the atmospheric pressure, and therefore, by supplying control signals to the respective electromagnetic directional control valves 41 to 44, the valve positions are switched whereby the braking pressures to the respective braking devices 11 through 14 can be adjusted.

Figure 5:
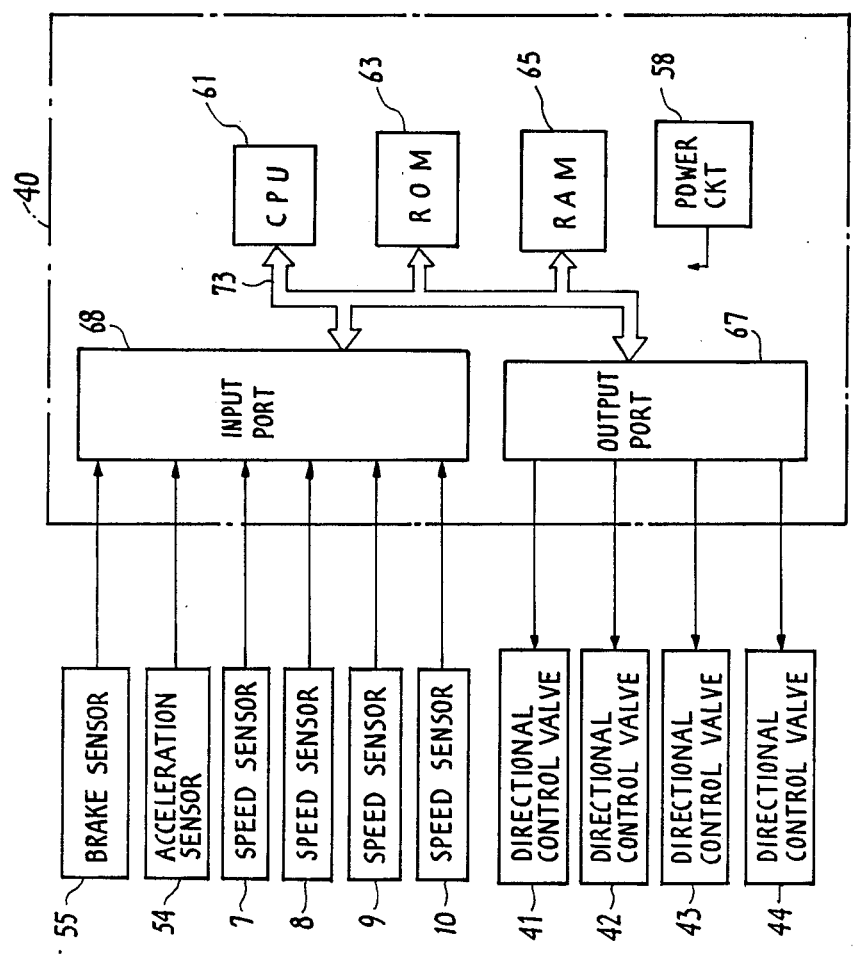
FIG. 5 is a block diagram illustrating an electronic control unit employed for the brake control system according to the present invention.

FIG. 5 is a block diagram showing the arrangement of the electronic control unit 40. As shown is the figure, the control circuit 30 comprises an input port 68 for receiving detection signals from each the sensor, a CPU 61 for executing computation and process which will be described hereinafter, a ROM 63 for storing control program and data used for the computation and process performed by the CPU 61, a RAM 65 for temporarily reading and storing various data at the time of execution of computation and process in the CPU 61, an output port 67 for outputting drive signals to each the electromagnetic directional control valves 41 through 44 so as to control the hydraulic pressures to the respective hydraulic pressure braking devices 11 through 14 in accordance with the results of the computation and process, a data bus 73, being a passage of the various data, which is provided for coupling between the respective units, and a power circuit 58.

The control unit 40 thus arranged, in a series of operation, detects a vehicle speed Vs at the time of braking operation of the vehicle on the basis of a vehicle speed immediately before the vehicle braking operation which is obtained as a result of detection by the rotational speed sensors 7 to 10 and acceleration/decelaration detected by the acceleration sensor 54, and sets a slip ratio corresponding to the operating amount of the brake pedal 24 stepped into by the vehicle driver and establishes target rotational speeds Vfl*, Vfr*, Vrl*, Vrr* for the respective wheels 1 to 4, and then calculates braking hydraulic pressures Pfl, Pfr, Prl, Prr of the respective braking devices 11 to 14 so that actual rotational speeds Vfl, Vfr, Vrl, Vrr of the respective wheels 3 to 6 are respectively equal to the target rotational speeds Vfl*, Vfr*, Vrl*, Vrr*, followed by controlling the drive of each of the electromagnetic directional control valves 41 through 44.

Figure 6:
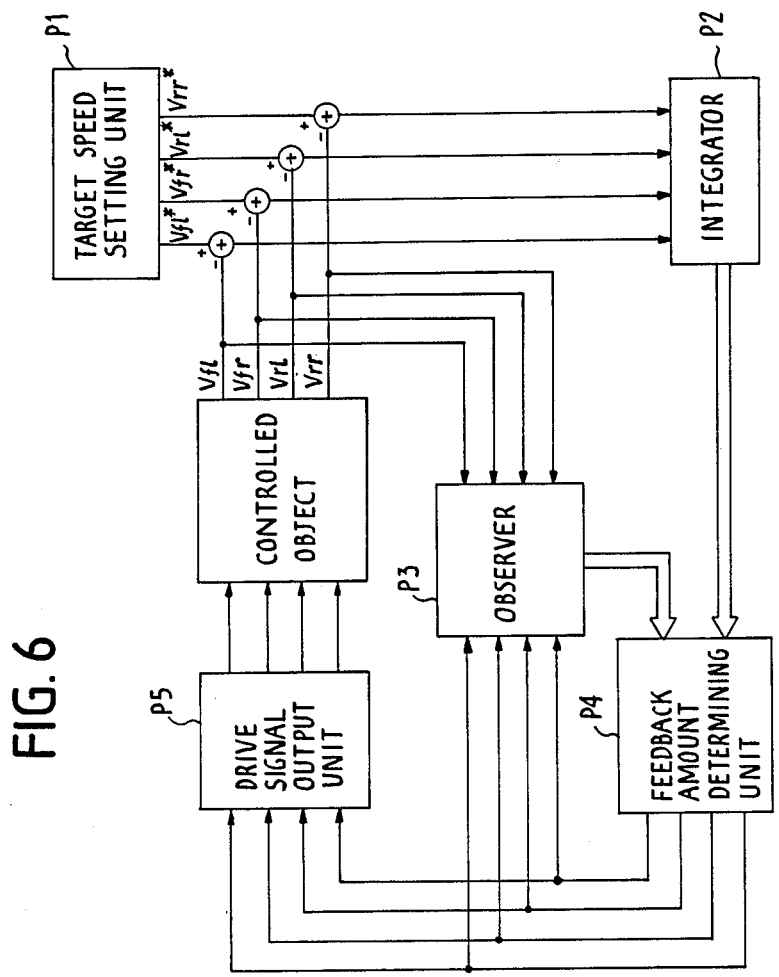
FIG. 6 is a diagram illustrating the control system of the electronic control unit of FIG. 5.

The control system of the electronic control unit (ECU) 40 will be described with reference to FIG. 6. The control system is actually executed in accordance with a control program indicated by a flow chart of FIG. 9 which will be hereinlater described, and does not illustrate a hardware arrangement.

As shown in the figure, the target rotational speeds Vf*, Vfr*, Vrl*, Vrr* of the respective wheels 1 to 4 are set by a target rotational speed setting portion P1 corresponding to the target rotational speed setting means M8. An integrator P2 accumulates deviations Sfl, Sfr, Srl, Srr of the actual rotational speed Vfl, Vfr, Vrl, Vrr detected by the respective rotational speed sensors 7 through 10 from the set target rotational speeds Vfl*, Vfr*, Vrl*, Vrr* to obtain accumulated values Zfl, Zfr, Zrl, Zrr, respectively.

An observer P3 estimates state variables $\hat{X}$ (k) representing the internal state of the vehicle on the basis of the detected rotational speeds Vfl, Vfr, Vrl, Vrr of the respective wheels 1 through 4 and the target braking hydraulic pressures Pfl*, Pfr*, Prl*, Prr* of the respective braking devices 11 to 14 from a feedback amount determining section P4, to obtain estimated state variavles $\hat{X}$ (k). The feedback amount determining section P4 adds a predetermined optimal feedback gain F to the obtained state variables $\hat{X}$ (k) and the accumulated values Zfl, Zfr, Zrl, Zrr obtained in the integrator P2 so as to calculate new target hydraulic pressures Pfl*, Pfr*, Prl*, Prr* to the braking drives 11 to 14. A drive signal outputting section P5 output drive signals Tfl, Tfr, Trl, Trr respectively corresponding to the obtained hydraulic pressures Pfl*, Pfr*, Prl*, Prr* of the respective braking devices 11 through 14 to the respective electromagnetic directional control valves 41 to 44.

Hereinabove, the arrangement of this control system has been simply described. Now it will be described about the construction of a dynamic model through actual system identification, the designing of the observer P3, and how to give the optimal feedback gain F.

Figure 7:
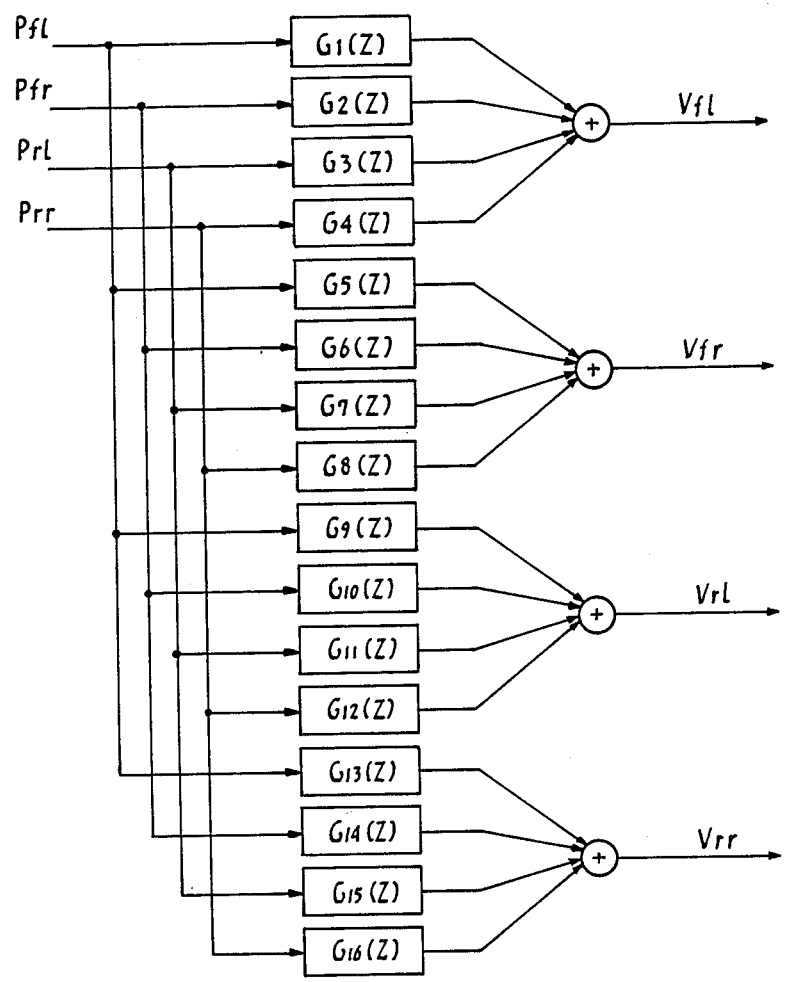
FIG. 7 is a diagram showing a control system having four inputs and four outputs.

First of all, a dynamic model of the system relating to the vehicle height is constructed. FIG. 7 is a diagram showing the control system of the present embodiment, i.e., a system having four inputs and four outputs by way of transfer functions G1(z) through G16(z). The reference z indicates z transformation of sampled values of the input/output signals, and it is assumed that G1(z) through G16(z) have appropriate order. Therefore, entire transfer function matrix G (z) is represented by:

$$G(z) = \begin{pmatrix} G1(z) & G2(z) & G3(z) & G4(z) \\ G5(z) & G6(z) & G7(z) & G8(z) \\ G9(z) & G10(z) & G11(z) & G12(z) \\ G13(z) & G14(z) & G15(z) & G16(z) \end{pmatrix}$$

The method of system identification is described in detail in "System Identification" written by Setsuo Sagara published by Society of Instrument and Control Engineers of Japan in 1981, and identification is performed here through least square method.

In running a vehicle under a predetermined condition, the braking hydraulic pressure Pfl is applied only to the braking device 11 of the front-left wheel 2 and the braking hydraulic pressure Pfl is varied, and then the rotational speed data of the front-left wheel 2 at that time is sampled N times. This is expressed as input data series of $\{u(i)\}=\{Pfl(i)\}$ and as output data series of $\{y(i)\}=\{Vfl(i)\}$ wherein i=1, 2, 3 ... N. Here, the system can be regarded as having one input and one output, and thus the transfer function G1(z) is given by:

$$G1(z) = B(z^{-1})/A(z^{-1}) \quad (3)$$

Therefore, $$G1(z) = (b0 + b1 \cdot z^{-1} + \ldots + bn \cdot z^{-n})/(1 + a1 \cdot z^{-1} + a2 \cdot z^{-2} + \ldots + an \cdot z^{-n}) \quad (4)$$

In the above, $z^{-1}$ is a unit shift operator indicating $z^{-1} \cdot x(k) = x(k-1)$.

When we determine parameters a1 to an and b0 to bn of Eq. (4) from the input and output data series $\{u(i)\}$ and $\{y(i)\}$, transfer function G1(z) can be obtained. These parameters are determined in system identification using least square method so that the following assumes a minimal value:

$$Jo = \sum_{k=0}^{N} [\{y(k) + a1 \cdot y(k-1) + \ldots + an \cdot y(k-n)\} - \{b0 \cdot u(k) + b1 \cdot u(k-1) + \ldots + bn \cdot u(k-n)\}] \quad (5)$$

Figure 8:
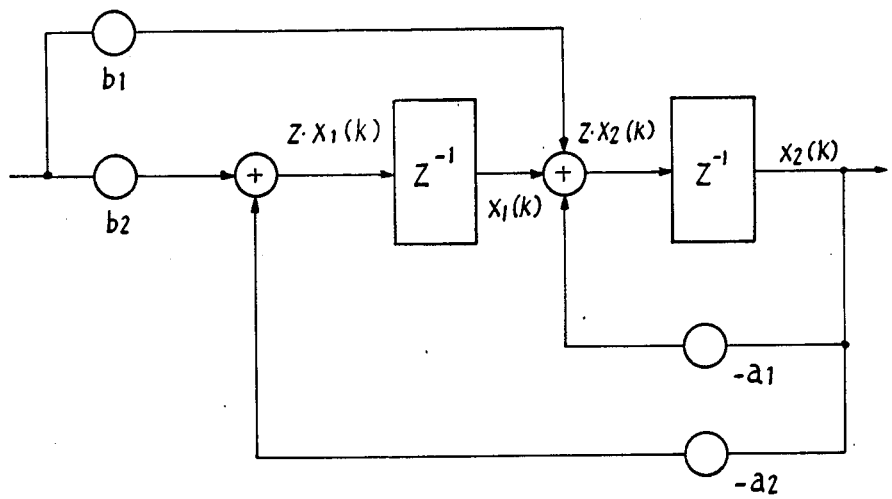
FIG. 8 is a diagram showing a signal flow used for obtaining system parameters from transfer function.

In this embodiment, respective parameters have been obtained assuming that n=2. In this case, a signal flow diagram of the system is as shown in FIG. 8, and using $[X1(k)\ X2(k)]^T$ as state variables, state and output equations thereof can be expressed by Eqs. (6) and (7):

$$\begin{pmatrix} X1(k+1) \\ X2(k+1) \end{pmatrix} = z\begin{pmatrix} X1(k) \\ X2(k) \end{pmatrix} = \begin{pmatrix} 0 & -a2 \\ 1 & -a1 \end{pmatrix}\begin{pmatrix} X1(k) \\ X2(k) \end{pmatrix} + \begin{pmatrix} b2 \\ b1 \end{pmatrix}u(k) \quad (6)$$

$$y(k) = [0\ 1]\begin{pmatrix} X1(k) \\ X2(k) \end{pmatrix} \quad (7)$$

Therefore, using system parameters A 1', B 1', C 1' for the parameters A, B, C in the case that the system is regarded as of one input and one output, we obtain:

$$A1' = \begin{pmatrix} 0 & -a2 \\ 1 & -a1 \end{pmatrix} \quad (8)$$

$$B1' = [b2\ b1]^T$$

$$C1' = [0\ 1]$$

In this way, transfer functions G1(z) through G16(z) as well as system parameters A 2' through A 16', B 2' through B 16', and C 2' through C 16' can be obtained.

Now the way of designing the observer P3 will be described. While as the way of designing is known Gopinath' method, which is described in detail in "Basic System Theory" written by Katsuhisa Furuta and Akira Sano published from Corona Co. Ltd. in 1978, the observer is designed as a finite time settling observer in this embodiment.

The observer P3 is used for estimating the internal state variable $\hat{X}$ (k) of the vehicle from the rotational speeds Vfl, Vfr, Vrl, Vrr of the respective wheels 1 to 4 and the braking hydraulic pressures Pfl, Pfr, Prl, Prr of the respective braking devices 11 to 14, and the reason why the state estimated variables $\hat{X}$ (k) obtained by the observer P3 can be handled as actual state variable $\hat{X}$ (k) in the control of the system will be made clear hereinbelow. Let us assume that the output $\hat{X}$ (k) from the observer P3 is constructed as the following Eq. (9):

$$\hat{x}(k) = (A - L \cdot C)\hat{x}(k-1) + B \cdot u(k-1) + L \cdot y(k-1) \quad (9)$$

In Eq. (9), L is a matrix arbrarily given. Modifying Eqs. (1), (2) and (9), we obtain:

$$[\tilde{x}(k) - \hat{x}(k)] = (A - L \cdot C)[\tilde{x}(k-1) - \hat{x}(k-)] \quad (10)$$

Therefore, if the matrix L is selected so that an eigenvalue of the matrix (A−L·C) is located within a unit circle, $\hat{X}$ (k)→X (k) with k→∞, and thus it is possible to accurately estimate the internal state variable X (k) of the controlled object using series u (*), y (*), from the past, of the input control vector u (k) and the output vector Y (k).

The vectors A, B, C of the state equation (1) and the output equation (2) both determined through system identification through least square methd, can be similarly transformed into the following observable canonical structure considering new state variable X (k)=T$^{-1}$·X (K) using nonsingular matrix T because the system is observable.

$$\overline{X}(k) = \overline{A}0 \cdot X(k-1) + \overline{B}0u(k-1) \quad (11)$$

$$y(k) = \overline{C}0 \cdot X(k) \tag{12}$$

In the above, $\overline{A}0 = T^{-1} \cdot A \cdot T$, $\overline{B}0 = T^{-1} \cdot B$, $\overline{C}0 = C \cdot C \cdot T$, and we obtain the following equations by selecting appropriate nonsigular T.

$$\overline{A}0 = \begin{pmatrix} 0 & 0 & \cdots & & -\alpha 1 \\ 1 & 0 & \cdots & & -\alpha 2 \\ 0 & 1 & & & \cdot \\ \cdot & & & & \cdot \\ \cdot & & & & \cdot \\ \cdot & & & & \cdot \\ 0 & 0 & \cdots & 1 & -\alpha n \end{pmatrix} \tag{13}$$

$$\overline{B}0 = [\beta 1 \; \beta 2 \ldots \beta n]^T \tag{14}$$

$$\overline{C}0 = [0 \; 0 \ldots 1] \tag{15}$$

Then, let L matrix of Eq.(10) be replaced as L = and $[-\alpha 1 \; -\alpha 2 \ldots -\alpha n]^T$, and we can now design a finite time settling observer as follows using equations (13), (14) and (15);

$$\overline{A}0 - L \cdot C0 = \begin{pmatrix} 0 & 0 & \cdots & & 0 \\ 1 & 0 & \cdots & & 0 \\ 0 & 1 & \cdots & & 0 \\ \cdot & & & & \cdot \\ \cdot & & & & \cdot \\ \cdot & & & & \cdot \\ 0 & 0 & \cdots & 1 & 0 \end{pmatrix} \tag{16}$$

In the above, $\overline{A}0, \overline{B}0$ and $\overline{C}0$ are obtained similarity transformation using A, B, and C, and it is also ensured that the control by the state equation is correct from this operation.

While the observer P3 has been designed using the vectors A, B and C of the state equation obtained through system identification, the output of the observer is now expressed in terms of $\hat{X}(k)$ hereinafter.

Now the way of obtaining the optimal feedback gain F will be described. Since the way of obtaining optimal feedback gain F is described in detail in the above-mentioned "Linear System Control Theory", only the results are shown here with the detail thereof being omitted.

Using $$\delta u(k) = u(k) - u(k-1) \ldots \tag{17}$$

$$\delta y(k) = y(k) - y(k-1) \ldots \tag{18}$$

in connection with the operating condition variables u (k) and operating state variables y (k), obtaining an optimal control input, i.e. driving condition u *(k) of the braking pressure generating section 30 (to put it concretely, the braking hydraulic pressures of the respective hydraulic pressure braking devices 13 to 16), which makes the following performance index J minimal, results in solving a control problem as an integral-added optimal regulator related to the control system of the internal combustion engine 1.

$$J = \sum_{k=0}^{\infty} [\delta y^T(k) \cdot Q \cdot \delta y(k) + \delta u^T(k) \cdot R \cdot \delta u(k)] \tag{19}$$

In the above, Q and R indicate weighted parameter matrixes, and k indicates the number of sampling times which is zero at the time of beginning of control, while the right side of Eq. (19) is an expression of so called quadratic form using diagonal matrixes of Q and R.

Here, the optimal feedback gain F is given as follows:

$$F = -(R + \overline{B}^T \cdot P \cdot \overline{B})^{-1} \cdot \overline{B}^T P \cdot \overline{A} \ldots \tag{20}$$

In Eq. (20), A and B are respectively given by:

$$\overline{A} = \begin{pmatrix} 1 & \overline{C}0 \cdot \overline{A}0 \\ 0 & \overline{A}0 \end{pmatrix} \tag{21}$$

$$\overline{B} = \begin{pmatrix} \overline{C}0 \cdot \overline{B}0 \\ \overline{B}0 \end{pmatrix} \tag{22}$$

Furthermore, P is a solution of the following Riccati equation:

$$P = \overline{A}^T \cdot P \cdot \overline{A} - \overline{A}^T \cdot P \cdot \overline{B} \cdot (\overline{B}^T \cdot P \cdot \overline{B} + R)^{-1} \cdot \tag{23}$$

$$\overline{B}^T \cdot P \cdot \overline{A} + \begin{pmatrix} Q & 0 \\ 0 & 0 \end{pmatrix}$$

In the above, the performance function J in Eq. (19) has a meaning that it is intended to reduce the deviation of the vehicle state variables y (k), i.e., the rotational speeds Vfl, Vfr, Vrl, Vrr of the respective wheels 1 to 4, from the target value y (k), i.e., the target rotational speeds Vfl*, Vfr*, Vrl*, Vrr*, with the variables, i.e., the braking pressures Pfl, Pfr, Prl, Prr, as the control inputs to the vehicle being regulated. The weighting of regulation for the rotational speeds Vfl, Vfr, Vrl, Vrr can be altered by changing the values of the weighted parameter matrixes Q and R. Therefore, the state variables X (k) can be obtained as state estimated X (k) using Eq. (9) if we obtain the optimal feedback gain F using Eq. (20) by obtaining P solving Eq. (23) with arbitrarily weighted parameter matrixes Q, R being selected using the dynamic model relating to the brake of the vehicle, i.e. matrixes A, B, C (which correspond to the above-mentioed A, B, C ) which is obtained in advance. Therefore, the control input u (k) for the vehicle can be obtained as follows:

$$u(k) = F \cdot [\hat{X}(k) \; Zfl(k) \; Zfr(k) \; Zrl(k) \; Zrr(k)]^T \ldots \tag{24}$$

By repeating simulation with the weighted parameter matrixes Q and R being altered until an optimal control characteristic is obtained, the optimal feedback gain F can be obtained.

While it has been described about the construction of the dynamic models of the control system of the vehicle made through system identification using least square method, the designing of finite time settling observer and the computation of the optimal feedback gain F, these are obtained in advance so that actual control is performed within the electronic control unit 40 using only the results thereof.

Now, an actual control performed by the electronic control unit 40 will be described with reference to a flowchart of FIG. 9. In the following description, an amount handled in a present processing is expressed by a subscript (k) and an amount handled in the latest cycle is expressed by another subscript (k−1).

Figure 9:
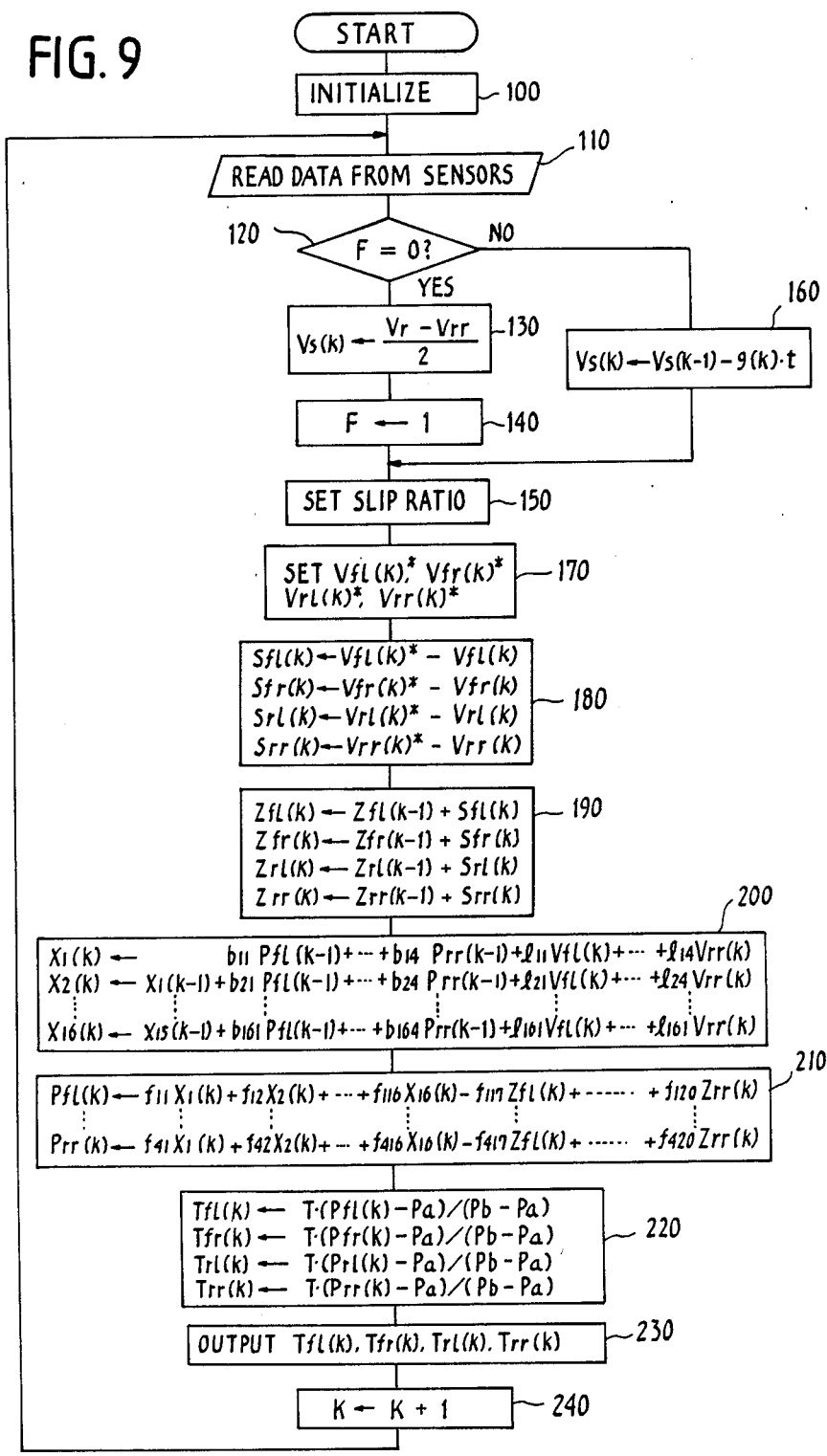
FIG. 9 is a flow chart illustrating a control program for the brake control of the first embodiment of the present invention.

The CPU 61 starts the brake control process shown in FIG. 9 in response to the brake demand made when the vehicle driver steps into the brake pedal 24 at the time of the running of the vehicle, and this process is repeatedly executed until released from the stepping-into of the brake pedal 24.

In response to the starting of the process, a step 100 is first executed for initializing flag, register and so on used for the execution of the process which will be hereinafter described. In a subsequent step 110, data from the respective sensors such as the rotationl speeds Vfl(k), Vfr(k), Vrl(k), Vrr(k), the stepping-into amount of the brake pedal 24 and the deceleration g(k) of the vehicle are inputted.

The control proceeds from the step 110 to a step 120 where a decision is made if a flag F is cleared. If the answer is "YES" (indicating immediately after the starting of this braking control), a subsequent step 130 is executed to calculate a vehicle speed Vs(k) as an average value of rotational speeds Vrr(k), Vrl(k) of the rear wheels 3 and 4. The step 130 is followed by a step 140 to set the flag F and then is followed by a step 150. On the other hand, if the answer is "NO" at the decision step 120 (indicating the case that this process is of two times or more), the control goes to a step 160 to calculate the vehicle speed Vs(k) as a function of the vehicle speed Vs(k−1) obtained in the previous process, the elapsed time period t therebetween, and the deceleration g(k), that is, by the following equation: Vs(k)←Vs(k−1) g(k)·t. The step 160 is followed by a step 150. The processes of the steps 120 through 140 or the steps 120 and 160 correspond to the vehicle speed detecting means M2.

In the step 150, a slip ratio SL corresponding to the braking demand from the vehicle driver is established using a map or an equation where the parameter is the spepping-into amount of the brake pedal 24 inputted in the step 110, thereafter followed by a step 170. In the step 170, target rotational speeds Vfl(k)*, Vfr(k)*, Vrl(k)*, Vrr(k)* of the respective wheels 1 through 4 are set on the basis of the established slip ratio SL and the calculated vehicvle speed Vs which are parameters, thereafter followed by a step 180.

The step 180 is provided for calculating the deviations Sfl(k), Sfr(k), Srl(k), Srr(k) of the actual rotational speeds of the step 110 Vfl(k), Vfr(k), Vrl(k), Vrr(k) from the set target rotational speeds Vfl(k)*, Vfr(k)*, Vrl(k)*, Vrr(k)*. The step 180 is followed by a step 190 in which accumulated values Zfl(k), Zfr(k), Zrl(k), Zrr(k) are calculated by adding the calculated deviations of the step 180 Sfl(k), Sfr(k), Srl(k), Srr(k) to the values Zfl(k), Zfr(k), Zrl(k), Zrr(k) accumulated in the previous processes. This process of the step 190 corresponds to the integrator P2. The steps 170 and 180 respectively correspond to the slip ratio setting means M7 and the target rotational speed setting means M8 (the target rotational speed setting section P1).

The control advances to a step 200 wherein new state estimated variables $\hat{X}$(k) are calculated by the following equation on the basis of the parameters of the observer A 0, B 0, L stored in advance in the ROM 63 after obtained by the above-mentioned method, the actual rotational speeds Vfl(k), Vfr(k), Vrl(k), Vrr(k) read in the step 110, the state estimated variables $\hat{X}$ (k−1)=[X1(k−1) X2(k−1) ... X6(k−1)] obtained in the previous step, and the braking pressures Pfl(k−1)*, Pfr(k−1)*, Prl(k−1)*, Prr(k−1)* of the respective hydraulic pressure braking devices 11 through 14 obtained in the previous step. This process corresponds to the observer P3 of FIG. 6, and as described above in this embodiment the observer P3 is arranged as a finite time settling observer. The state estimated variables $\hat{X}$(k) is given by:

$$\begin{aligned}\hat{X}(k) &= M\hat{X}(k-1) + B0\, u(k-1) + LY(k-1) \\ &= M\hat{X}(k-1) + B0[Pfl(k-1)\ Pfr(k-1)\ Prl(k-1) \\ &\quad Prr(k-1)] + L[Vfl(k)\ Vfr(k)\ Vrl(k) \\ &\quad Vrr(k)]\end{aligned} \quad (25)$$

where M = A 0 − LC 0

In a subsequent step 210, the state estimated value $\hat{X}$(k) obtained in the step 200, the accumulated values Zfl(k), Zfr(k), Zrl(k), Zrr(k) obtained in step 190, the feedback gain prepared in advance and stored in the ROM 33 which feedback gain is given by:

$$F = \begin{pmatrix} -f11 & -f12 & \cdots & -f16 & f17 & f18 & f19 & f110 \\ -f21 & -f22 & \cdots & -f26 & f27 & f28 & f29 & f210 \\ -f31 & -f32 & \cdots & -f36 & f37 & f38 & f39 & f310 \\ -f41 & -f42 & \cdots & -f46 & f47 & f48 & f49 & f410 \end{pmatrix}$$

are vector multiplied, that is, [Pfl(k) Pfr(k) Prl(k) Prr(k)] = F [$\hat{X}$(k) Zfl(k) Zfr(k) Zrl(k) Zrr(k)]$^T$, whereby the braking hydraulic pressures Pfl(k), Pfr(k), Prl(k), Prr(k) of the respective braking devices 11 through 14 are obtained. This corresponds to the feedback amount determining portion P4 of FIG. 6.

In a following step 220, to give the obtained braking hydraulic pressures Pfl(k), Pfr(k), Prl(k), Prr(k) of the respective braking devices 11 through 14, drive signals Tfl(k), Tfr(k), Trl(k), Trr(k) for driving the elctromagnetic directional control valves 41 to 44 are produced in accordance with the equation:

Tfl(k) = T·(Pfl(k) − Pa)/(Pb − Pa)

Tfr(k) = T·(Pfr(k) − Pa)/(Pb − Pa)

Trl(k) = T·(Prl(k) − Pa)/(Pb − Pa)

Trr(k) = T·(Prr(k) − Pa)/(Pb − Pa)

where
Pa = pressure within oil returning pipe (atmospheric pressure)
Pb = pressure within oil supplying pipe
T = control period of each of the electromagnetic directional control valves 41 through 44

Figure 10:
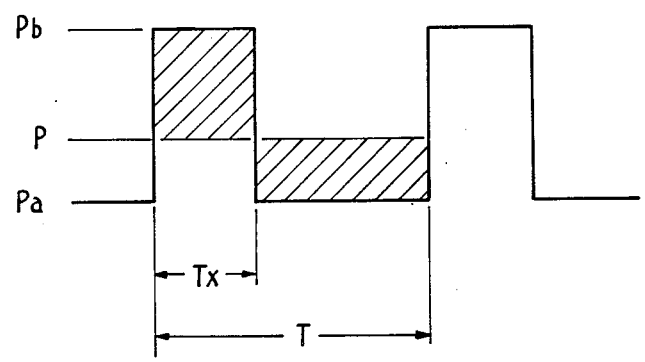
FIG. 10 is an illustration for describing the drive signal to an electromagnetic directional control valve.

That is, in this embodiment, the drive control of the electromagnetic directional control valves 41 through 44 is performed in accordance with so-called duty control, and as shown in FIG. 10, for example, when a drive signal is outputted by Tx time period within a predetermined time period T, the average hydraulic pressure P of the hydraulic pressure braking devices is given by P = (Tx/T) (Pb − Pa) + Pa, and if the average hydraulic pressure P is a target hydraulic pressure, a drive time period Tx per the predetermined time period T can be obtained by Tx = T·(P − Pa)/(Pb − Pa).

A subsequent step 230 is executed to supply the obtained drive signals Tfl(k), Tfr(k), Trl(k), Trr(k) to the elctromagnetic directional control valves 41 to 44, followed by a step 240 wherein k indicating sampling times is incremented by one. The operational flow returns to the step 110.

As described above, the braking hydraulic pressure is controlled while the vehicle is braked, and therefore, it is possible to decrease the speed of the vehicle or stop the same with the slip ratio corresponding to the demand from the vehicle driver and to stop the vehicle with a minimum distance at the time of rapidly braking operation. Accordingly, if the brake system according to the present embodiment is mounted on a vehicle, the running stabilty and safety are extremely improved when the vehcile is braked.

In the above-mentioned embodiment, the brake pedal 24 and the actuator 30 of the brake system are perfectly separated. However, in consideration of failure of the actuator 30, it is desirable to arrange such that during the failure the braking hydraulic pressure is generated by stepping the brake pedal 24 and is delivered to the respective braking devices 11 through 14.

Furthermore, in the above-described embodiment, it has been described as the target rotational speeds Vfl*, Vfr*, Vrl*, Vrr* of the respective wheels are respectively equal to a value obtained as a function of the vehicle speed Vs and the slip ratio SL. However, if the target rotational speeds of the left and right wheels are set to have different values in accordance with, for example, control angle of the steering, the brake of the vehicle at the time of rapid curve running can be performed under more accurate control, resulting in improvement in safety.

Figure 11:
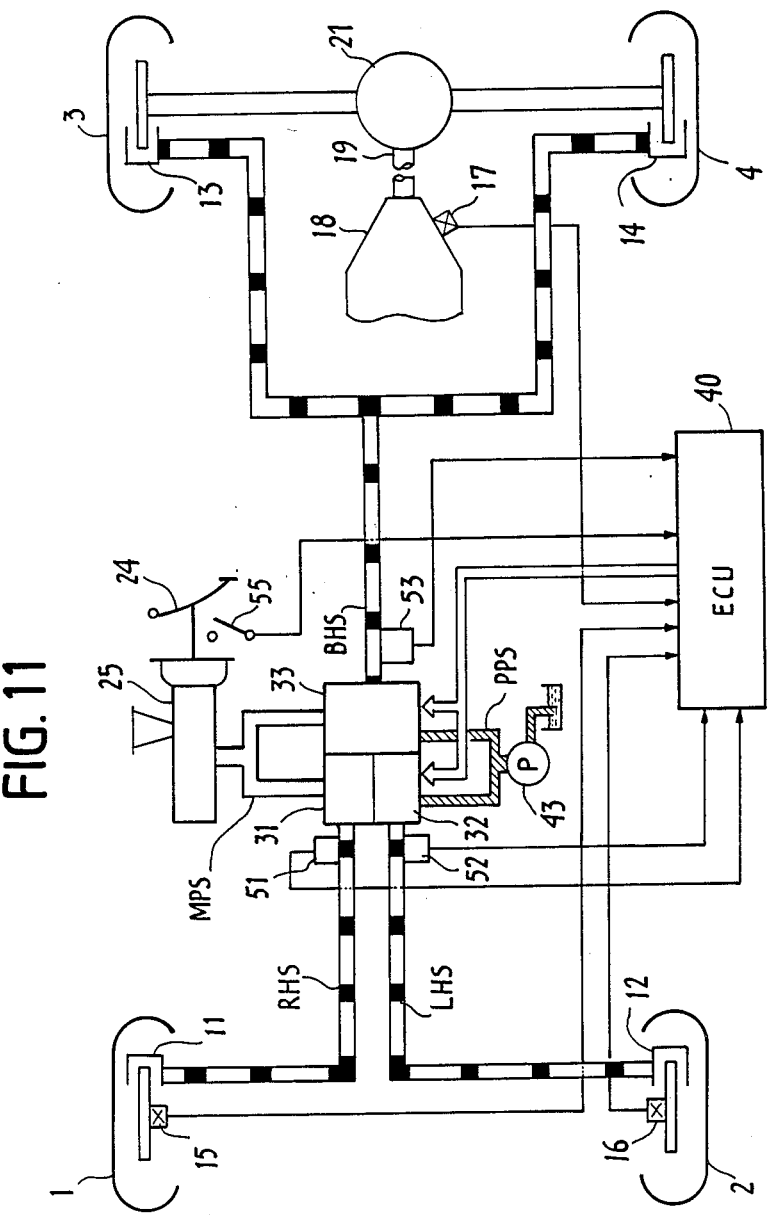
FIGS. 11 and 12 are schematic diagrams showing a brake control system according to further embodiment of the present invention incorporated with a brake system of a motor vehicle.
Figure 12:
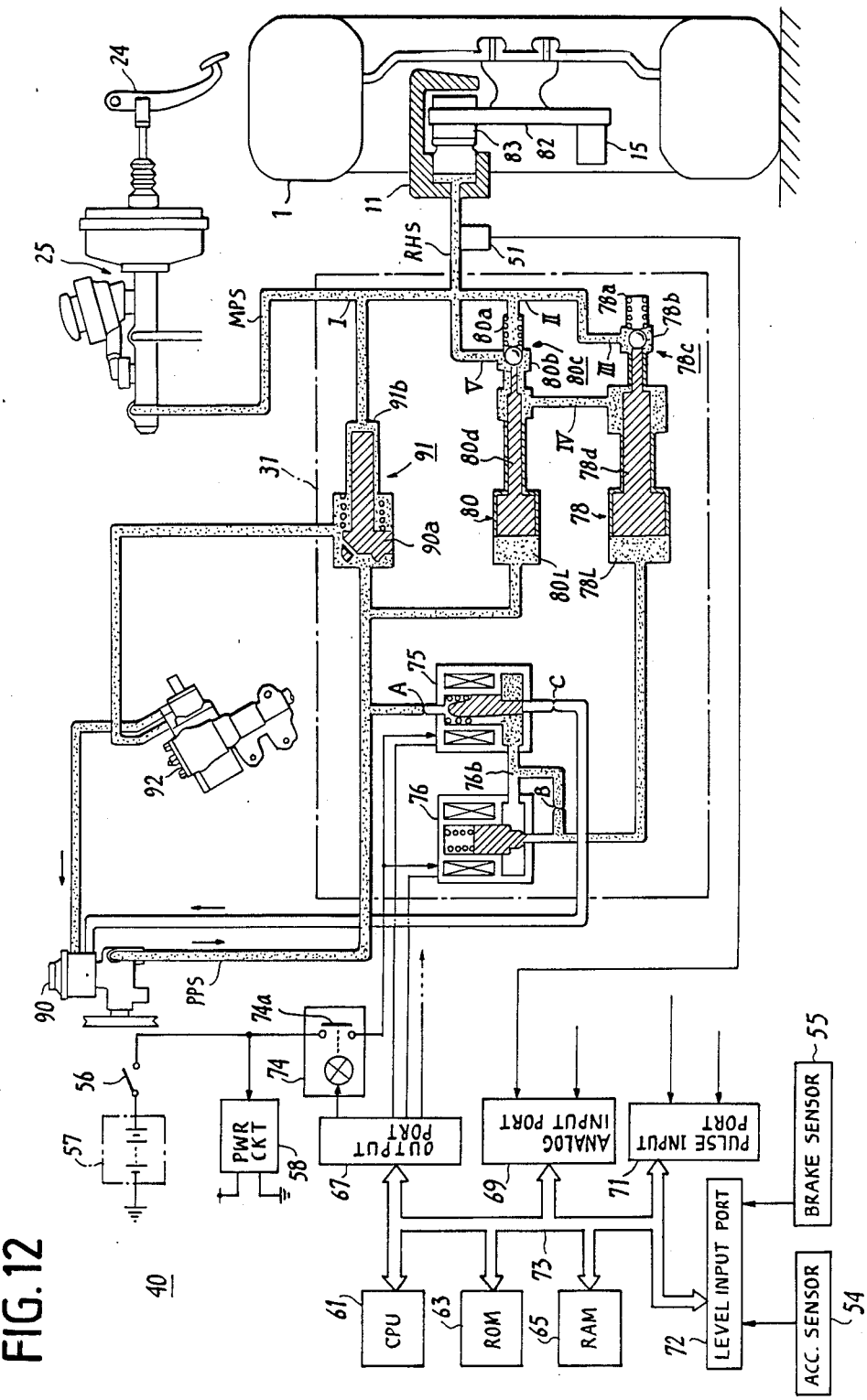

Further embodiments of the present invention will be hereinafter described with reference to FIGS. 11 to 20. Of these drawings, FIGS. 11 and 12 are schematic diagrams showing a brake control system according to the embodiment of the present invention incorporated in a brake system of a motor vehicle.

As illustrated in the figures, braking devices 11, 12, 13, 14 are provided for braking wheels 1, 2, 3, 4 of the vehicle with hydraulic pressure, which the braking devices correspond to braking devices M5 of FIG. 1. The front wheels 1, 2 are respectively equipped with electromagnetic pickup type speed sensors 15 and 16 for sensing the speed in terms of rotation of the wheel such as rotational speed of the wheel, speed of rotation of the wheel and angular velocity of rotation of the wheel (which will be referred to as wheel speed). The speeds of the rear wheels 3 and 4 are detected by a wheel speed sensor 17 provided on a transmission 18, the rotation of rear wheels 3, 4 being made through a differential gear 21 in accordance with the rotation of a main shaft of the transmission 18. In this case, it is appropriate that two speed sensors are provided for the respective rear wheels 3 and 4.

The braking devices 11 through 14 provided for the respective wheels act for the braking of rotation of the wheels 1 to 4 using the high hydraulic pressure generated by a master cylinder 25, such as tandem type cylinder, which is operatively coupled to a brake pedal 24 of the vehicle. The braking hydraulic pressure delivered from the master cylinder 25 through a hydraulic pressure system MPS is regulated by actuators 31, 32 and 33. The actuators 31, 32 and 33 control independently the braking hydraulic pressures applied to the front-right wheel 1, the front-left wheel 2 and the rear wheels 3 and 4 under control of an electronic control unit (ECU) 40. The actuators 31 through 33, the arangement of which will be hereinafter described in detail, respectively act as the hydraulic pressure adjusting means for adjusting the braking hydraulic pressure for each of the wheels 1 though 4 using the hydraulic pressure delivered from a hydraulic pressure generating device 43 for power steering through the hydraulic pressure system (power steering hydraulic pressure system PPS). The hydraulic pressure of a hydraulic pressure system RHS applied to the front-right wheel 1 for brake is detected by a hydraulic pressure sensor 51, and the hydraulic pressure of a hydraulic pressure system LHS applied to the front-left wheel 2 is detected by a hydraulic pressure sensor 52. Furthermore, The hydraulic pressure of a hydraulic pressure system BHS applied to the rear wheels 3 and 4 is detected by a hydraulic pressure sensor 53.

The ECU 40 is responsive to signals indicative of the hydraulic pressure values from these hydraulic pressure sensors 51, 52, 53, signals indicative of wheel speeds from the speed sensors 15, 16, 17, and a signal from a brake sensor 55 for detecting the operating amount of the brake pedal 24, and controls the actuators 31, 32, 33 for controlling the brake for the respective wheels 1 through 4, for example, performing the control of slip ratio of each the wheels.

The control of braking force is performed independently for the front-right wheel 1, front-left wheel 2 and the rear wheels 3 and 4, and therefore, the description of the control will be hereinbelow described about only the front-right wheel 1 with reference to FIG. 12, which is a diagram illustrating, particularly, the system controlling the brake for the front-right wheel 1.

As illustrated in FIG. 12, The ECU 40 has a power circuit 58 coupled through an ignition key 56 to a battery 57 for supplying a constant voltage to the whole unit, and includes a central processing unit (CPU) 61 and its associated units such as a read-only memory (ROM) 63, a random access memory (RAM) 65, an output port 67, an analog input port 69, a pulse input port 71 and a level input port 72, which are connected through a common bus 73 therebetween. The ECU 40 is constructed as an arithmetic and logic circuit, and is arranged to control the braking hydraulic pressure delivered from the master cylinder 25 through a pressure-decreasing cylinder 78 and a bypass cylinder 80 to the braking device 11 by operating a main relay 74, and a main solenoid-operated valve 75 and a secondary solenoid-operated valve 76 in the actuator 31. In response to the increase of the braking hydraulic pressure the braking device 11 acts to stop the rotation of the wheel 1 by pressing a friction pad 83 against a disc 82 which is rotated together with the wheel 1.

To the actuator 31 is delivered the power steering hydraulic pressure from a power steering hydraulic pressure generating device 43 comprising a power steering hydraulic pressure pump 90 and a reservior (not shown). In the condition in which the control of the hydraulic pressure is not performed particularly, in power steering hydraulic pressure system PPS, oil is circulated from the hydraulic pressure pump 90 through a regulator 91 of the actuator 31 and a power steering gear box 92. A regulator piston 91a of the regulator 91 receives the braking pressure at end surface 91b thereof and, in response to the increase of the braking hydraulic pressure, acts to make small the cross-sectional area of the passage of the power steering hydraulic pressure system PPS so that the hydraulic pressure of power steering hydraulic pressure system (which will be referred to as steering hydraulic pressure) is increased in accordance with the braking hydraulic pressure.

The main portion of the pressure-decreasing cylinder 78 comprises a cutoff valve 78c having a spring 78a and a ball 78b and a presure-decreasing piston 78d. The pressure-decreasing piston 78d is operated in accordance with the balance between the force provided by the braking hydraulic pressure and the force provided by the steering hydraulic pressure, and is normally pushed into the position shown in FIG. 12 to set the cutoff valve 78c to the opening condition because a receiving portion defined at an end of the pressure-decreasing piston 78d receives the steering hydraulic pressure as it is when the main solenoid-operated valve 75 and the secondary solenid-operated valve 76 are respectively set to the off-condition.

Similarly, the bypass cylinder 80, the main portion of which comprises a directional control valve 80c having a spring 80a and a ball 80b, and a bypass piston 80d, is normally set to the position shown in FIG. 12. Therefore, In this condition, when the braking pressure is increased by the master cylinder 25 in response to the brake pedal 24 being operated, the braking hydraulic pressure is fed through the passages I - II - III - IV - V of the braking hydraulic pressure system MPS shown in FIG. 12 to the braking device 11.

On the other hand, when the ECU 40 is in the normally operating condition and the control of the slip ratio is performed in the condition that the main relay 74 is driven through the output port 67 so that a contact 74a thereof is closed, the braking hydraulic presure is controlled as follows.

(1) When determination is made wherein the wheel 1 is excessively braked to cause slippage due to high braking hydraulic pressure (for example, SL>0.2), the ECU 40 controls the actuator 31 so that the main solenoid-operated valve 75 is set to on-condition. In this case, since a valve 75a of the main solenoid-operated valve 75 is lifted upward in FIG. 12, the steering hydraulic pressure being supplied to the pressure-decreasing cylinder 78 is cut off. As a result, oil within a left-chamber 78L of the pressure-decreasing cylinder 78 is slowly discharged through orifices B and C to the reservoir (not shown) of the steering hydraulic pressure system PPS. Therefore, the pressure-decreasing piston 78d is moved so that the cutoff valve 78c is closed. The braking pressure is slowly decreased because the volume of the braking pressure system PHS is gradually increased in accordance with the movement thereof.

(2) In the similar condition, when the secondary solenoid-operated valve 76 is set to on-condition, a bypass passage 76b is defined which bypasses the orifice B and oil within the left-chamber 78L of the pressure-decreasing cylinder 78 is rapidly discharged through only the orifice C, resulting in rapid decrease in the braking hydraulic pressure.

(3) On the other hand, when the main solenoid-operated valve 75 is set to off-condition, the discharging of the oil made through the orifice C is stopped, and oil is rapidly introduced from the steering hydraulic pressure system PPS through an orifice A and the bypass passage 76b and the pressure in the left-chamber 78L of the pressure-decreasing cylinder 78 is increased. As a result, the pressure-decreasing piston 78d is rapidly pushed and the braking pressure is rapidly increased.

(4) In this condition, when the secondary solenoid-operated valve 76 is further set to off-condition, the bypass passage 76b is closed and the introduction of oil from the steering hydraulic pressure system PPS is performed through the orifices A and B and the pressure in the left-chamber 78L is slowly increased, resulting in slow increase in the braking hydraulic pressure.

Figure 13:
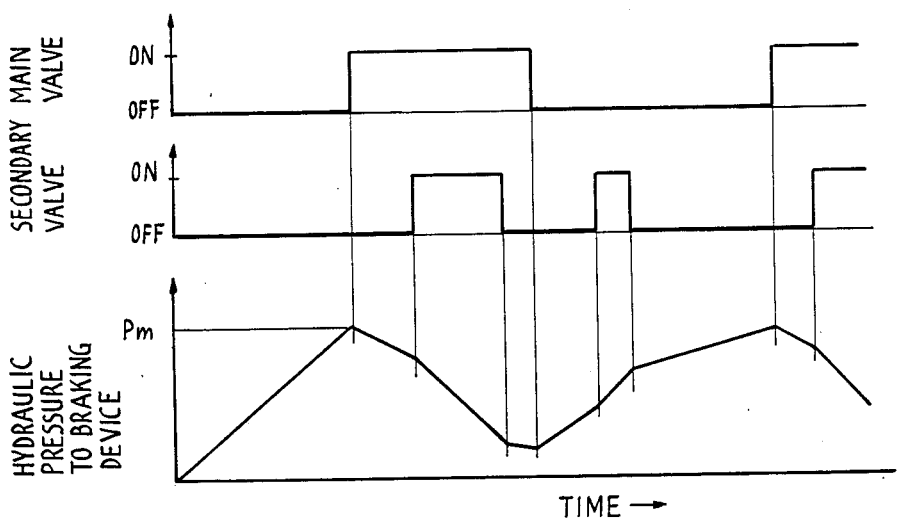
FIG. 13 is a timing chart useful for understanding the relationship between the conditions of the solenoid-operated valves and the hydraulic pressure.
Figure 14:
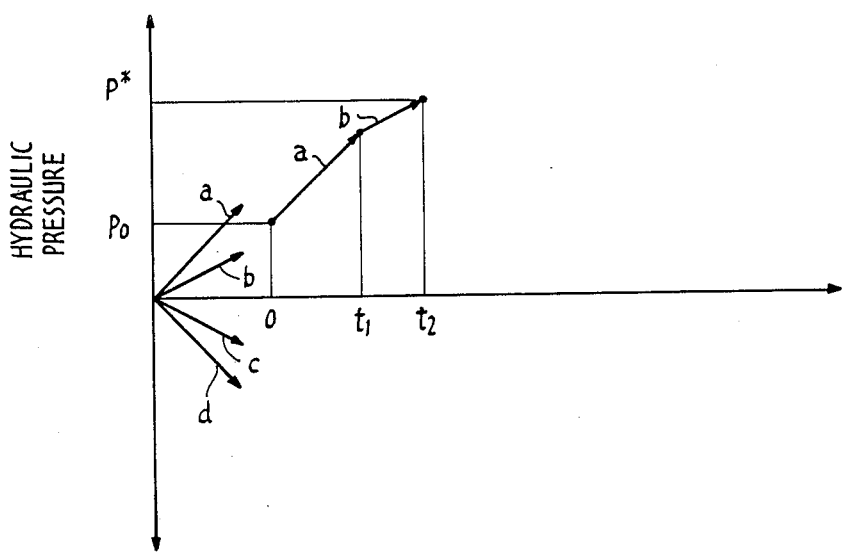
FIG. 14 is a graph for describing control patterns for hydraulic pressure.

FIG. 13 is a timing chart useful for understanding the relationship between the conditions of these solenoid-operated valves 75 and 76 and the braking hydraulic pressure. As illustrated, the hydraulic pressure for the braking device 11, depending upon the hydraulic pressure (Pm) generated by the master cylinder 25 in accordance with the braking operation made by the vehicle driver, is increased or decreased in respense to the conditions of the respective solenoid-operated valves 75 and 76. Therefore, as shown in FIG. 14, in order to obtain a required hydraulic pressure P*, it is necessary to control the opening and closing time periods of the solenoid-operated valves 75 and 75. Assuming that the hydraulic pressure at the present time is Po and the required hydraulic pressure at the time t2 is P*, in this hydraulic pressure system, it is required that the braking hydraulic pressure is controlled by sequentially selecting one from control patterns including rapid pressure-increasing a, slow pressure-increasing b, slow pressure-decreasing c, and rapid pressure-decreasing d. That is, the hydraulic pressure is rapidly increased between the time t0 and the time t1 and it is slowly increased between the time ti and time t2.

Figure 15:
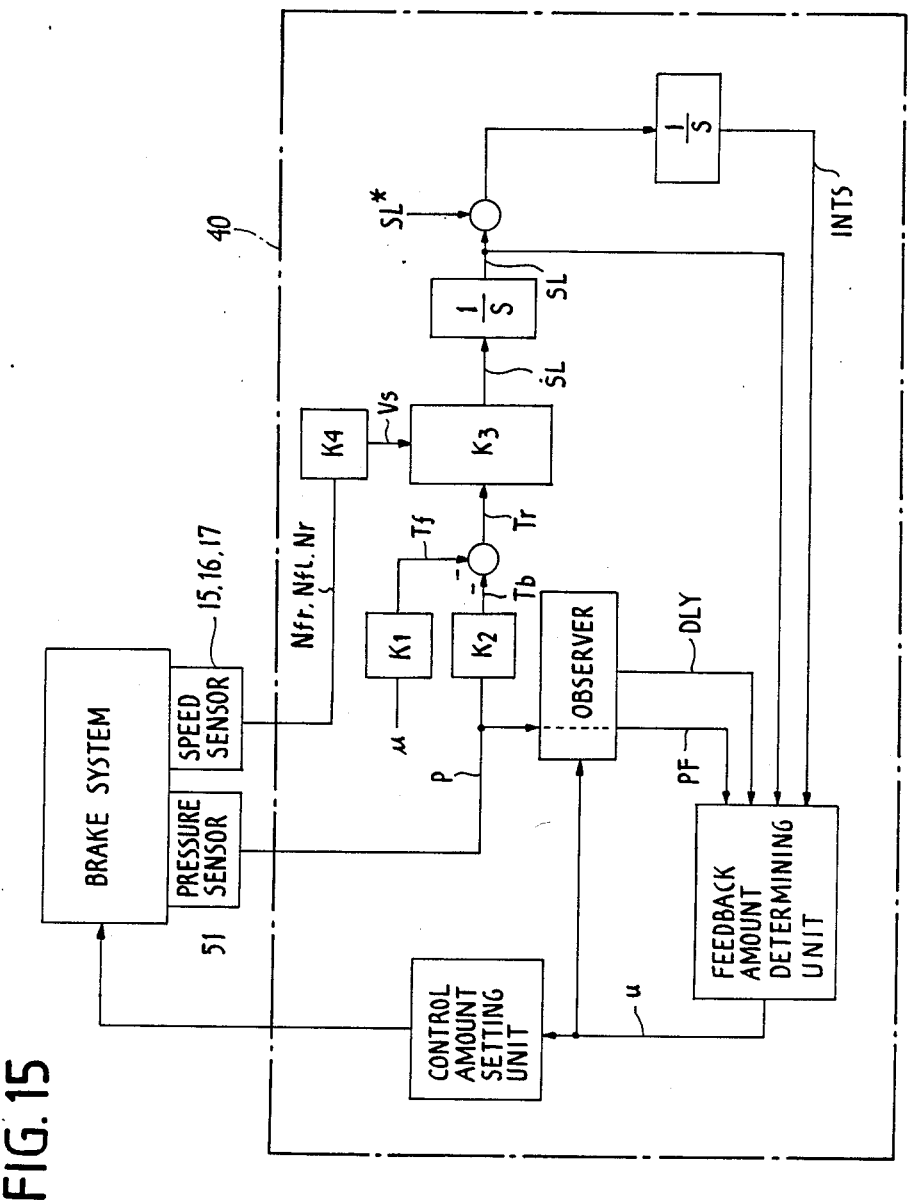
FIG. 15 is a signal flow chart useful for describing the signal process and the system control in a second embodiment of the present invention.

The summary in terms of the signal process and system control in the second embodiment of the present invention will be described with reference to FIG. 15 which does not illustrate the arrangement of hardware, but shows a manner of signal process. The actual signal process is performed in accordance with the control program indicated by a flow chart of FIG. 16 which will be described hereinlater.

In this embodiment, the finally controlled object is the slip ratio SL of the wheel and the slip ratio SL is controlled to be equal to the target slip ratio SL*. Therefore, the physical quantities to be directly detected are the hydraulic pressure P of the braking devices 11 through 14 with respect to the wheels 1 through 4 and the wheel speeds Nfr, Nfl, Nr detected by the wheel speed sensors 15, 16, 17 and so on. The ECU 40 derives a braking torque Tb with respect to the wheel by multiplying the hydraulic pressure P for the wheel by a coefficient K2 previously obtained in experimentation. On the other hand, using the friction coefficient between the wheel and the road surface, it is possible to obtain a rotational torque Tf, which is provided by the road surface in the direction that the wheel should be rotated, using a coefficient K1 determined in advance. The coeffcient K1 represents a value obtained on the basis of a load W applied to the wheel, the radius of rotation r of the wheel, and a constant. In this embodiment, the friction coefficient $\mu$ between the wheel and the road surface is not actually detected and this control system is arranged such that the control of slip ratio can be sufficiently performed irrespective of the variations of the friction coefficient, i.e., in the range of the values (for example, 0.7±0.4) obtained in practice. However, it is appropriate to detect the friction coefficient by means of sensor, for example.

The rate of change of slip ratio can be obtained using an actual torque Tr, i.e., the difference (Tf−Tb) between the braking torque Tb applied from the braking device 11 to the wheel 1 and the rotational torque Tf applied from the road surface to the wheel 1. Here, a vehicle speed Vs can be estimated on the basis of the wheel speeds detected by the wheel speed sensors 15, 16 and 17 and this is indicated as a coefficient K4 in FIG. 15. The vehicle speed V can be obained by assuming that the vehicle speed is decreased at a predetermined ratio (deceleration G) after the vehicle speed at that time is obtained from the wheel speed of idling wheel immediatly before braking operation.

Using the vehicle speed Vs thus obtained, the rate of change $\dot{SL}$ of the wheel slip ratio can be obtained by multiplying the actual torque Tr by the coefficient K3. The coefficient K3 is given by K3'·r / I·V, where I represents inertia and K3' is a coefficient. Since the linear approximation over the overall range of the vehicle speed V is difficult, a range satisfying the linear approximation in accordance with the vehicle speed V is actually determined and the control model is treated on the basis of the perturbation component from the steady-state point in each of the ranges. Therefore, for the calculation $\dot{SL}$=Tr (K3'·r / I·V), actually, the process on the basis of the perturbation component from predetermined speeds (for example, 10 Km/hr, 30 Km/hr, 60 Km/hr, 100 Km/hr) is performed.

The slip ratio $\dot{SL}$ is obtained by integrating the rate of change $\dot{SL}$ of slip ratio thus obtained (1/S on S plane performing the signal process). The deviation between the slip ratio $\dot{SL}$ and the target slip ratio SL* is integrated (1/S) to calculate the accumulated value INTS. This corresponds to the integral element of first order. It is appropriate that the target slip ratio is a fixed value and it is also acceptable to varying the same in accordance the control.

On the other hand, by constructing the observer, the variable DLY corresponding to dead time on control and hydraulic pressure P as state variables are obtained on the basis of the hydraulic pressure PF, which is a control output, and the hydraulic pressure P actually detected. Since the element of the dead time treated in this embodiment can be represented as $e^{-LS}$ on the S plane, this can be treated as state variable DLY by Padé's approximation. In this embodiment, the Padé's approximation is regarded as second order approximation.

The control amount u for the hydraulic pressure of the hydraulic pressure system to be controlled is calculated by mulitiplying the slip ratio SL, the accumulated value INST, the variable DLY the hydraulic pressure P obtained in the above-mentioned signal process by an optimal feedback gain F predetermined. Since the hydraulic pressure is actually contolled in accordance with the valve-opening and valve-closing operation of the main solenoid-operated valve 75 and the secondary solenoid-operated valve 76, the actual control amount of hydraulic pressure is obtained in a control amount seeting section and is outputted to the system to be controlled.

According to the state equation (1) and the output equation (2), in this embodiment, the state variables X (k) of the expanded system, the control output u (k) to the controlled object, and the output y (k) of the controlled object are respectively treated as follows.

$$X(k) = \begin{pmatrix} DLY \\ P \\ SL \\ INTS \end{pmatrix} \quad (25)$$

$$u(k) = u \quad (26)$$

$$y(k) = \begin{pmatrix} SL \\ DLY \\ INTS \\ P \end{pmatrix} \quad (27)$$

A description of control actually performed by the ECU 40 will be hereinbelow made with reference to FIG. 16. In the description, a subscript "k" indicates that value is of the present time and a subscript "k−1" indicates that the value is of the previous time which has been treated in the previous process performed before the sampling time T.

Figure 16:
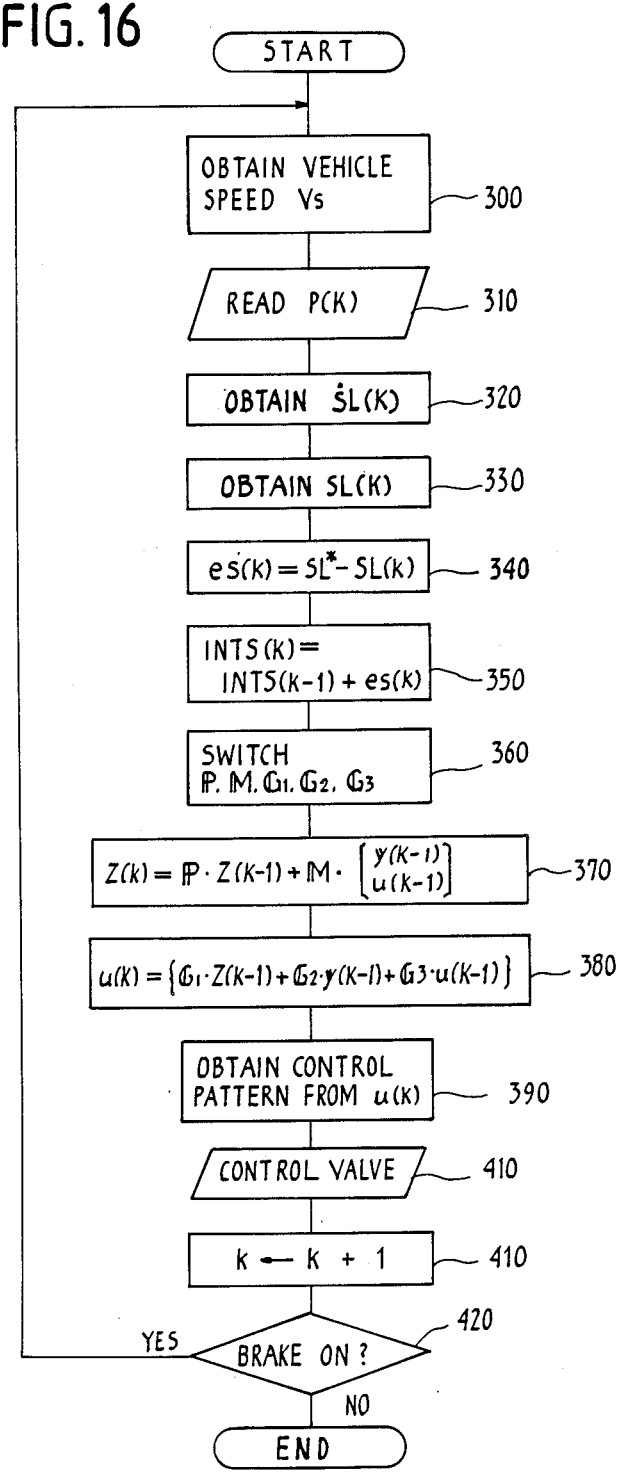
FIG. 16 is a flow chart showing a control probram for brake control of the second embodiment of the present invention.

The CPU 61 starts the brake control process shown in FIG. 16 in response to the brake demand from the vehicle driver which is made by stepping into the brake pedal 24 when the vehicle running, and repeatedly executes the process until the brake pedal 24 is released.

A step 300 is first executed wherein the present vehicle speed Vs is derived on the basis of the wheel speed immediatly before the braking operation. Since the wheel speeds Nfr, Nfl of non-driven wheels, i.e., right and left front wheels 1, 2 immediately before the start of brake correspond to the vehicle speed, the vehicle speed Vs can be obtained on the basis of the wheels speeds, and deceleration and elapsed time period thereafter.

A subsequent step 310 is executed to read a hydraulic pressure P(k) of the hydraulic pressure system for braking the front-right wheel 1 through the hydraulic pressure sensor 51. A step 320 follows to obtain a rate of change $\dot{SL}$ (k) of the slip ratio. The rate of change SL of the slip ratio, as decribed above, is calculated from coefficients K1, K2, K3 using the hydraulic pressure P(k) and the vehicle speed Vs. Here, the calculation is made using perturbation component in accordance with the vehicle speed. The steady-state points are 100 Km/hr, 60 Km/hr, 30 Km/hr, and 10 Km/hr.

A step 330 is executed to obtain an actual slip ratio SL(k) by integrating the rate of change SLSL(1) obtained in the step 320 and is followed by a step 340 in which the target slip ratio SL*, i.e., deviation es(k) of the actual slip ratio SL(k) from 0.2, is given by the following equation:

$$es(k) = SL^* - SL(k) \quad (28)$$

In a subsequent step 350, the accumulated valve INTS of the deviation es(k) is obtained in accordance with the following equation:

$$INTS(k) = INTS(k-1) + T \cdot es(k) \quad (29)$$

Thereafter, control goes to a step 360 to select parameters $\overline{P}$, $\overline{M}$, $\overline{C}$, $\overline{D}$, G 1, G 2, G 3, which will be used in the following steps, in accordance with the vehicle speed V. The parameters $\overline{P}$, $\overline{M}$ are used for computing variable Z(k) of the observer, and the parameters G 1, G 2, G 3 are used for computing the control amount u(k). These parameters are selected in accordance with sections determined as ranges enabling linear approximation on the basis of the vehicle speed.

A subsequent step 370 is executed to compute the variable Z(k) in the observer using the parameters P, M. The observer is designed as a minimal order observer and estimates a variable DLY corresponding to the dead time in accordance with Pade's second order approximation. In the case of the internal variable=Z(k), the estimation of the state variable X (k−1) is made as follows:

$$Z(k) = P \cdot Z(k-1) + M \cdot \begin{pmatrix} y(k-1) \\ u(k-1) \end{pmatrix} \quad (30)$$

$$\hat{X}(k-1) = \overline{C} \cdot Z(k-1) + \overline{D} \cdot y(k-1) \quad (31)$$

Here, the parameters P, M, $\overline{C}$, $\overline{D}$ and so on can be obtained from a predetermined dynamic model ( A, B, C ) of the system to be controlled. The paramenters in the case of 60 Km/hr are as follows:

$$P = [-1]$$

$$M = [0 \quad -1.19 \times 10^5 \quad 0 \quad 1.21 \times 10^5 \quad 0]$$

$$\overline{C} = \begin{pmatrix} 1 \\ 0 \\ 0 \\ 0 \end{pmatrix}$$

$$\overline{D} = \begin{pmatrix} 0 & 1 & 0 & -1 \\ 0 & 1 & 0 & -1 \\ 1 & 0 & 0 & 0 \\ 0 & 0 & 1 & 0 \end{pmatrix}$$

Control proceeds to a step 380 to obtain the control output u(k). The control outout u(k) can be obtained as a function of the optimal feedback gain F and the state variable X (k), that is, $$u(k) = -F X(k) \ldots \quad (32)$$

however, it is difficult to directly use X (k) due to the dead time of the braking system. While, since X (k)=A X (k−1)+B·u(k−1) according to the state equation (1), it is possible to approximate using A·X (k−1)+B u(k−1) already obtained, instead of X (k). Therefore, the control output u(k) is given by $$u(k) = -\{F \cdot A \cdot X(k-1) + F \cdot B \cdot u(k-1)\} \ldots \quad (33)$$

here, the state variable X (k−1) obtained from the equation (31) can be replaced with the estimated value $\hat{X}$ (k−1) of the observer. That is, $$u(k) = -\{F \cdot A \cdot \overline{C} \cdot Z(k-1) + F \cdot A \cdot \overline{D} \cdot y(k-1) + F \cdot B \cdot u(k-1)\} \ldots \quad (34)$$

in this case, the optimal feedback gain F has been given by: $F = -(R + B^T \cdot P \cdot B)^{-1} \cdot B^T \cdot P \cdot A \ldots$ (35)

Here, P is a solution of the following Riccati equation:

$$P = A^T \cdot P \cdot A - A^T \cdot P \cdot B \cdot (B^T \cdot P \cdot B + R)^{-1} \cdot \quad (36)$$

$$B^T \cdot P \cdot A + \begin{pmatrix} Q & 0 \\ 0 & 0 \end{pmatrix}$$

Furthermore, Q, and R are the parameters used for simulation which make the following performance function J to a minimum and selected as optimal values.

$$J = \sum_{k=0}^{\infty} [y^T(k) \cdot Q \cdot y(k) + u^T(k) \cdot R \cdot u(k)] \quad (37)$$

Therefore, F is predetermined and, according to this embodiment, the optimal feedback gain F for vehicle speed 60 Km/hr is obtained as:

$$F = [-3.87 \times 10^{-3} \, 4.81 \times 10^{-1} \, 1.14 \times 10^3 \, 20 \, 1.0 \times 10^4]$$

Thus, it is possible to determine the parameters G 1, G 2, G 3 in advance as follows:

$$G\,1 = F \cdot A \cdot \overline{C} \ldots \quad (38)$$

$$G\,2 = F \cdot A \cdot \overline{D} \ldots \quad (39)$$

$$G\,3 = F \cdot B \ldots \quad (40)$$

The parameters P, C, D, G 1, G 2, G 3 are switched in accordance with the vehicle speed as described above. These parameters are in advance determined such that the speed of convergence of the system becomes slow as the vehicle speed is decreased. That is, in the case that control in which the steady-state point is the vehicle speed 10 Km/hr is performed by appropriately varying Q, R in the simulation of the performance function J, the system can be stably maintained irrespective of the detection error of the wheel sensors 15, 16, 17 by relatively making slow the convergence of the system against disturbance.

In this embodiment, G 1 and G 3 are respectively vector of 1×1, i.e., scalar quantity.

In a step 380, using G 1, G 2, G 3, the hydraulic pressure u(k) is calculated as the control output in accordance with the following calculation.

$$u(k) = -\{G\,1\,Z(k-1) + G\,2\,y(k-1) + G\,3\,u(k-1)\}. \quad (41)$$

A subsequent step 390 is executed to determine a control pattern of the hydraulic pressure on the basis of the control output u(k) obtained in the step 380. That is, as described above with reference to FIG. 14, the valve-opening and valve-closing time periods of the main solenoid-operated valve 75 and the secondary solenoid-operated valve 76 are controlled so as to reach the hydraulic pressure u(k) for the sampling time period T.

A step 400 is executed to control the main valve 75 and the secondary valve 76 in accordance with the control pattern obtained in the step 390, followed by a step 410 in which K indicating the number of sampling times is incremented by one.

Control proceeds to a step 420 wherein the condition of the brake sensor 55 read through the level input port 72 is checked and a decision is made if the vehicle is on braking operation. When the brake pedal is still operated, that is, it is on braking operation, the operational flow returns to the step 300 and the above-mentioned steps are repeated. When the brake pedal has been released, this routine is terminated.

According to this embodiment thus arranged, since the dead time of the system controlling the braking hydraulic pressure of the braking device 11 is approximated or estimated by the observer, it is possible to control such that the slip ratio SL of the wheel 1 is equal to the target slip ratio SL* without causing the excessive control due to the dead time, resulting in maintaining the drive feeling and stopping the vehicle with a minimal braking distance.

Figure 17:
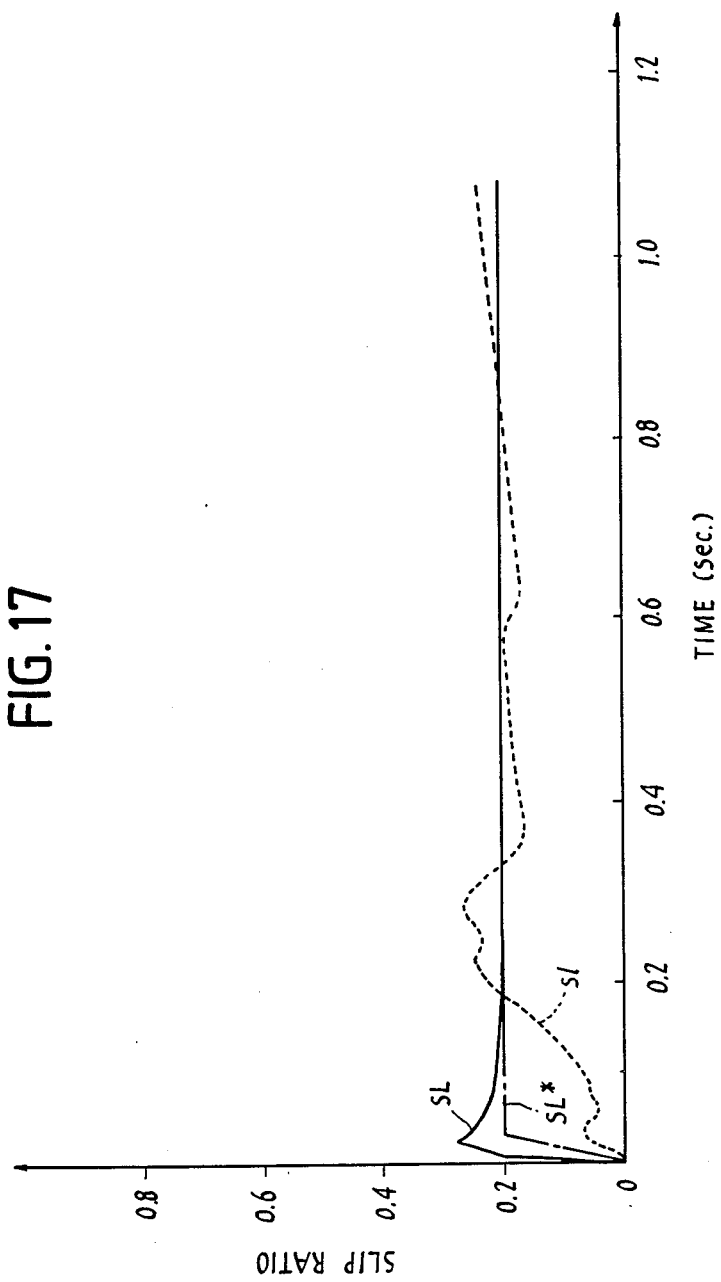
FIG. 17 is a graph showing the control of the slip ratio of the wheel immediately after braking operation.

FIG. 17 is a graph showing the control of the actual slip ratio of the wheel immediately after the braking operation is started and the target slip ratio SL is set to 0.2, in which the present embodiment is compared with the conventional technique. According to the brake control system of the present embodiment, the actual slip ratio SL (indicated by soild line) is once overshot to the vicinity of 0.27 with respect to the target slip ratio SL* (indicated by dashed line), and it is immediatly controlled to 0.2 without undershoot. On the other hand, the conventional system causes a hunting due to the delay in the hydraulic pressure system such as delay of operation of the solenoid-operated valves, and therefore the slip ratio sl (indicated by broken line) cannot be made stable for a long time. Furthermore, in the conventional system shown in the figure, the drive feeling is taken in serious consideration as compared with the braking characteristics, and therefore the braking distance is longer as compared with the system according to the present embodiment. It is understood from the figure that the present embodiment results in extremely excellent characteristics in response and stability. Furthermore, according to the present embodiment, since the brake of the weel 1 can be stably controlled irrespective of variations of the friction coefficient in wide range ($\mu = 0.7 \pm 0.4$), the slip ratio can be stably controlled even if the vehicle runs the road surface on which the friction coefficient is rapidly varied or the road on which the friction coefficient is defferent with respect to the right and left wheels, resulting in maintaining high braking characteristics.

Figure 18:
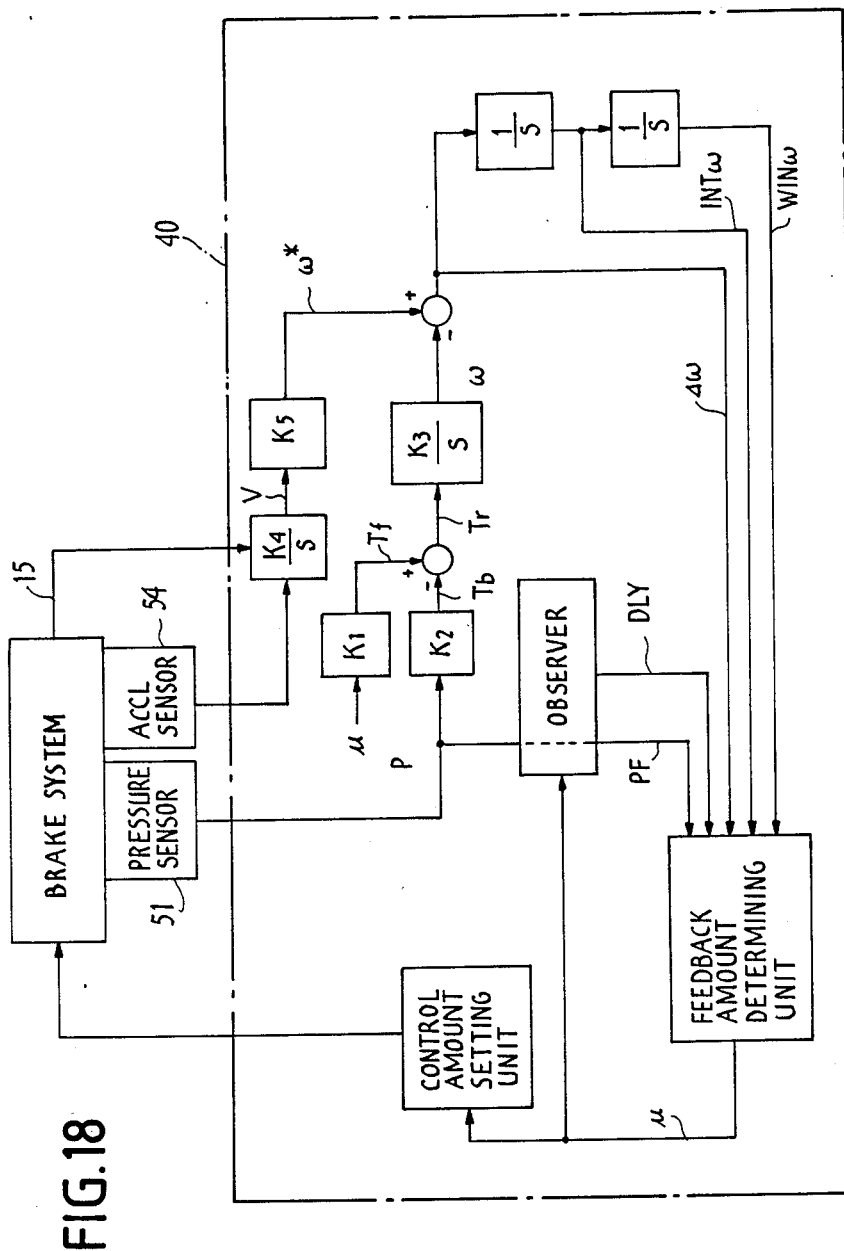
FIG. 18 is a signal flow chart useful describing the signal process and the system control in a third embodiment of the present invention.

The summary in terms of the signal process and system control in a third embodiment of the present invention will be described with reference to FIG. 18 which does not illustrate the arrangement of hardware, but shows a manner of signal process. The actual signal process is performed in accordance with the control program indicated by a flow chart of FIG. 19 which will be described hereinlater.

In this embodiment, the finally controlled object is the wheel speed, i.e., angular velocity $\omega$ of rotation of the wheel and the angular velocity $\omega$ is controlled to be equal to the target angular velocity $\omega^*$. Therefore, the physical quantities to be directly detected are the hydraulic pressure P of the braking devices 11 through 14 with respect to the wheels 1 through 4 and the wheel speeds Nfr, Nfl, Nr detected by the wheel speed sensors 15, 16, 17, acceleration G of the vehicle detected by the acceleration sensor 54, and so on. The ECU 40 derives a braking torque Tb with respect to the wheel by multiplying the hydraulic pressure P for the wheel by a coefficient K2 previously obtained in experimentation. On the other hand, using the friction coefficient between the wheel and the road surface, it is possible to obtain a rotational torque Tf, which is provided by the road surface in the direction that the wheel should be rotated, on the basis of a coefficient K1 determined in advance. The coefficient K1 represents a value obtained on the basis of a load W applied to the wheel, the radius of rotation r of the wheel, and a constant. In this embodiment, the friction coefficient $\mu$ between the wheel and the road surface is not actually detected and this control system is arranged such that the control of slip ratio can be sufficiently performed irrespective of the variations of the friction coefficient, i.e., in the range of the values (for example, $0.7 \pm 0.4$) obtained in practice. However, it is appropriate to detect the friction coefficient by means of sensor, for example.

The angular velocity $\omega$ can be obtained using an actual torque Tr, i.e., the difference (Tf−Tb) between the braking torque Tb applied from the braking device 11 to the wheel 1 and the rotational torque Tf applied from the road surface to the wheel 1. Here, the angular velocity $\omega$ can be obtained by integrating (1/S) the actual torque Tr and multiplying a coefficient K3 wherein inertia I is taken in account. The vehicle speed Vs can be calculated by integrating (1/S) one time the vehicle speed Vo obtained from the speed Nfr of the wheel 1 immediately before the braking operation and the acceleration G then detected by the acceleration sensor 54 (in general equation, $Vs = Vo + Gt$, where t represents a time period elapsed from the start of the braking operation). This is indicated by K4/S in FIG. 18. Using the vehicle speed Vs thus obtained, The target angular velocity $\omega^*$ is obtained on the basis of the slip ratio SL, the radius r of rotation of the wheel 1 and a constant K5', that is, the target angular velocity $\omega^*$ is given by $\omega^* = K5'\ Vs\ (1-SL)/r$. This process is indicated by K5/S in FIG. 18. It is appropriate that the slip ratio SL is a fixed value and it is also acceptable to varying the same in accordance with the control. The accumulated value INT$\omega$ of first order is obtained by integrating (1/S) the deviation $\Delta\omega$ of the actual angular velocity $\omega$ of the wheel 1 from the target angular velocity $\omega$. The accumulated value INT$\omega$ is integrated to obtain the accumulated value WIN$\omega$ of second order for making follow-up in connection with the vehicle speed (angular velocity of the wheel) as ramp function when the vehicle speed is decreased.

On the other hand, by constructing the observer, the variable DLY corresponding to dead time on control and hydraulic pressure PF as state variables are obtained on the basis of the hydraulic pressure PF, which is a control output, and the hydraulic pressure P actually detected. Since the element of the dead time treated in this embodiment can be represented as $e^{-LS}$ on the S plane, this can be treated as state variable DLY by Pade's approximation. In this embodiment, the Pade's approximation is regarded as second order approximation.

The control amount u for the hydraulic pressure of the hydraulic pressure system to be controlled is calculated by mulitiplying the deviation $\Delta\omega$ of angular velocity, the accumulated values INS$\omega$ and WIN$\omega$, the variable DLY, the hydraulic pressure P obtained in the above-mentioned signal process by an optimal feedback gain F predetermined. Since the hydraulic pressure is actually controlled in accordance with the valve-opening and valve-closing operation of the main solenoid-operated valve 75 and the secondary solenoid-operated valve 76, the actual control amount of hydraulic pressure is obtained in a control amount seeting section and is outputted to the system to be controlled.

According to the state equation (1) and the output equation (2), in this embodiment, the state variables X (k) of the expanded system, the control output u (k) to the controlled object, and the output y (k) of the controlled object are respectively treated as follows.

$$X(k) = \begin{pmatrix} DLY \\ P \\ \Delta\omega \\ INT\omega \\ WIN\omega \end{pmatrix} \quad (42)$$

$$u(k) = u \quad (43)$$

$$y(k) = \begin{pmatrix} \Delta\omega \\ DLY \\ INTS \\ WIN\omega \\ P \end{pmatrix} \quad (44)$$

A description of control actually performed by the ECU 40 will be hereinbelow made with reference to FIG. 19. In the description, a subscript "k" indicates that value is of the present time and a subscript "k−1" indicates that the value is of the previous time which has been treated in the previous process performed before the sampling time T.

Figure 19:
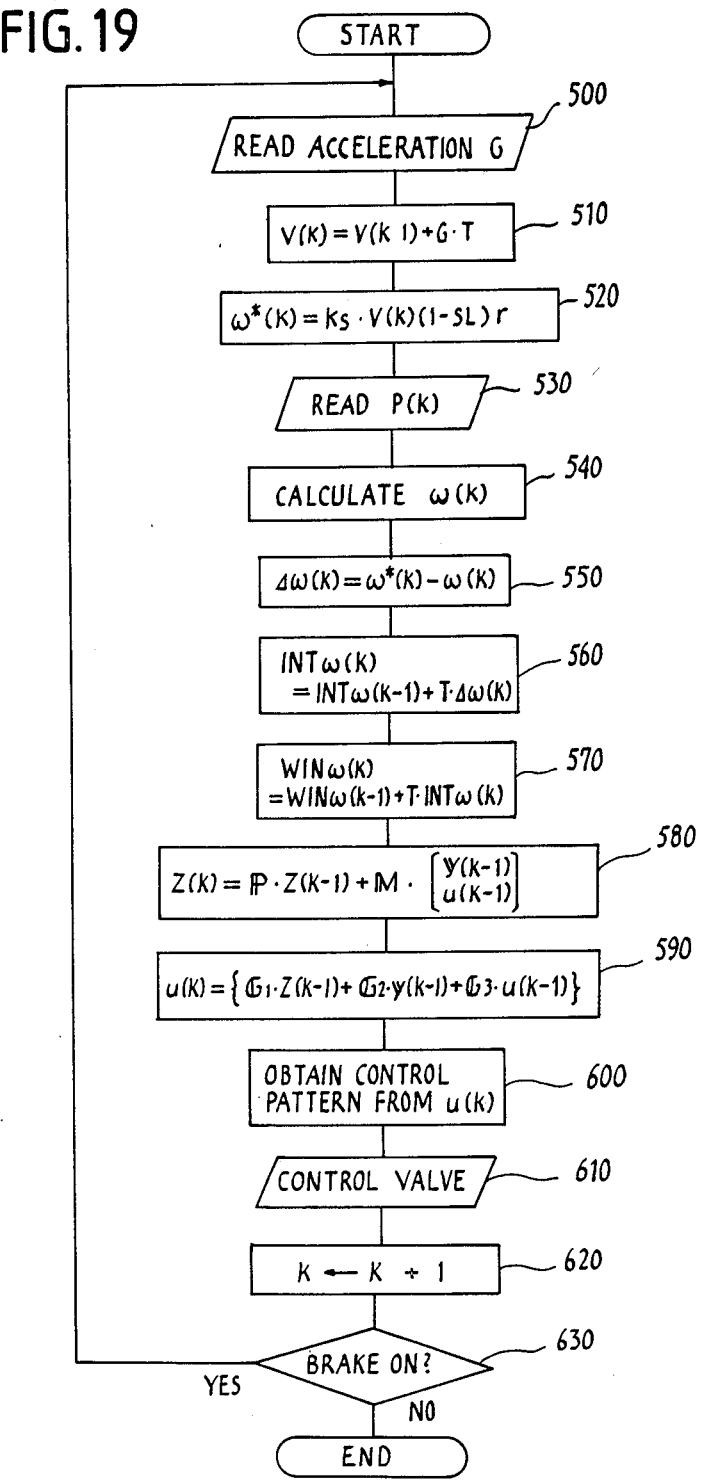
FIG. 19 is a flow chart illustrating a control program for brake control of the third embodiment.

The CPU 61 starts the brake control process shown in FIG. 19 in response to the brake demand from the vehicle driver which is made by stepping into the brake pedal 24 when the vehicle running, and repeatedly executes the process until the brake pedal 24 is released.

A step 500 is first executed to read the acceleration of the vehicle (assuming minus value in the case of decreasing the speed) obtained by the acceleration sensor 54, and is followed by a step 510 in which the present vehicle speed V(k) is obtained in accordance with the following equation.

$$V(k) = V(k-1) + G \cdot T \ldots \quad (45)$$

where, T represents the time required for processing this control routine by one time.

The initial value Vo of the vehicle speed V(k) can be obtained from the wheel speed Nfr of the front-right wheel 1 which has been rotated as non-driven wheel with the speed corresponding to the vehicle speed immediately before the braking operation. That is, the steps 500 and 510 functions as means for detecting the vehicle speed.

In a step 520, the target angular speed ω is calculated on the basis of the vehicle speed V(k), that is, the target angular velocity ω is given by $$\omega^* = K5' \cdot V(k) \cdot (1 - SL)/r \ldots \quad (46)$$

A subsequent step 530 is executed to read the hydraulic pressure P(k) of the hydraulic pressure system for the front-right wheel 1 detected by the hydraulic pressure sensor 51. A step 540 follows to obtain the angular velocity ω(k). The angular velocity ω(k) is obtained as described with reference with FIG. 18. The steps 530 and 540 function as means for detecting the angular velocity of rotation of the wheel.

A subsequent step 550 is executed to obtain the deviation Δω(k) of the actual angular velocity ω(k) in the step 540 from the target angular velocity ω(k), followed by steps 560 and 570 in which the deviation Δω(k) is integrated. In the step 560, as first order integration, the following calculation is made.

$$INT\omega(k) = INT\omega(k-1) + T \cdot \Delta\omega(k)$$

While, in the step 570, the integration is further made, that is, $$WIN\omega(k) = WIN\omega(k-1) + T \cdot INT\omega(k)$$

Therefore, these integrations results in obtaining accumulated values INTω(K) and WINω(k).

A subsequent step 580 is executed to compute the variable Z(k) in the observer using the parameters P, M predetermined. The observer is designed as a minimal order observer and estimates a variable DLY corresponding to the dead time in accordance with Pade's second order approximation. In the case of the internal variable = Z(k), the estimation of the state variable $\overline{X}$ (k−1) is made as follows:

$$Z(k) = P \cdot Z(k-1) + M \cdot \begin{pmatrix} y(k-1) \\ u(k-1) \end{pmatrix} \quad (47)$$

$$\hat{X}(k-1) = C \cdot Z(k-1) + D \cdot y(k-1) \quad (48)$$

Here, the parameters P, M, $\overline{C}$, $\overline{D}$ and so on can be obtained from a predetermined dynamic model (A, B, C) of the system to be controlled. The paramenters are as follows:

$$P = [-1]$$

$$M = \begin{bmatrix} 0 & -1.19 \times 10^5 & 0 \\ 0 & 1.21 \times 10^5 & 0 \end{bmatrix}$$

$$\overline{C} = \begin{pmatrix} 1 \\ 0 \\ 0 \\ 0 \end{pmatrix}$$

$$\overline{D} = \begin{pmatrix} 0 & 1 & 0 & 0 & -1 \\ 0 & 1 & 0 & 0 & -1 \\ 1 & 0 & 0 & 0 & 0 \\ 0 & 0 & 1 & 0 & 0 \\ 0 & 0 & 0 & 1 & 0 \end{pmatrix}$$

Here, the state variables other than the hydraulic pressure PF and the variable DLY corresponding to the dead time are included in the outputs of the observer. However, these state variables are merely formal variables and in practice the respective variavles (Δω, INTω, WINω) obtained in the steps 550 through 570 are outputted as it is.

Control proceeds to a step 590 to obtain the control output u(k). The control outout u(k) can be obtained as a function of the optimal feedback gain F and the state variable X (k), that is, $$u(k) = -F \cdot X(k) \ldots \quad (49)$$

however, it is difficult to directly use X (k) due to the dead time of the braking system. While, since $X$ $(k)=A \cdot X(k-1)+B \cdot u(k-1)$ according to the state equation (1), it is possible to approximate using $A \cdot X(k-1)+B \cdot u(k-1)$ already obtained, instead of $X(k)$. Therefore, the control output $u(k)$ is given by $$u(k) = -\{F \cdot A \cdot X(k-1) + F \cdot B \cdot u(k-1)\} \ldots \quad (50)$$

here, the state variable $X(k-1)$ obtained from the equation (48) can be replaced with the estimated value $\overline{X}(k-1)$ of the observer. That is, $$u(k) = -\{F \cdot A \cdot \overline{C} \cdot Z(k-1) + F \cdot A \cdot \overline{D} \cdot y(k-1) + F \cdot B \cdot u(k-1)\} \ldots \quad (51)$$

in this case, the optimal feedback gain has been given by:

$$F = -(R + B^T \cdot P \cdot B)^{-1} D \cdot B^T \cdot P \cdot A \ldots \quad (52)$$

Here, P is a solution of the following Riccati equation:

$$P = A^T \cdot P \cdot A - A^T \cdot P \cdot B \cdot (B^T \cdot P \cdot B + R)^{-1} \cdot \quad (52)$$

$$B^T \cdot P \cdot A + \begin{pmatrix} Q & 0 \\ 0 & 0 \end{pmatrix}$$

Furthermore, Q, and R are the parameters used for simulation which make the following performance function J to a minimum and selected as optimal values.

$$J = \sum_{k=0}^{\infty} [y^T(k) Q \cdot y(k) + u^T(k) \cdot R \cdot u(k)] \quad (54)$$

Therefore, F is predetermined and, the optimal feedback gain F according to this embodiment is as follows.

$$F = [2.81 \times 10 \ \ 1.00 \times 10^3 \ \ 1.00 \times 10^2 \ \ 1.18 \times 10^{-3} \ -5.11 \times 10^{-2}]$$

Thus, it is possible to determine the parameters G 1, G 2, G 3 in advance as follows:

$$G\ 1 = F \cdot A \cdot \overline{C} \ldots \quad (55)$$

$$G\ 2 = F \cdot A \cdot \overline{D} \ldots \quad (56)$$

$$G\ 3 = F \cdot B \ldots \quad (57)$$

The parameters P, M, $\overline{C}$, $\overline{D}$, G 1, G 2, G 3 are switched in accordance with the vehicle speed as described above. These parameters are in advance determined such that the speed of convergence of the system becomes slow as the vehicle speed is decreased.

In this embodiment, G 1 and G 3 are respectively vector of $1 \times 1$, i.e., scalar quantity.

In a step 590, using G 1, G 2, G 3, the hydraulic pressure $u(k)$ is calculated as the control output in accordance with the following calculation.

$$U(k) = -\{G\ 1 \cdot Z(k-1) + G\ 2 \cdot y(k-1) + G\ 3 \cdot u(k-1)\}. \quad (58)$$

A subsequent step 600 is executed to determine a control pattern of the hydraulic pressure on the basis of the control output $u(k)$ obtained in the step 590. That is, as described above with reference to FIG. 14, the valve-opening and valve-closing time periods of the main solenoid-operated valve 75 and the secondary solenoid-operated valve 76 are controlled so as to reach the hydraulic pressure $u(k)$ for the sampling time period T.

A step 610 is executed to control the main valve 75 and the secondary valve 76 in accordance with the control pattern obtained in the step 600, followed by a step 620 in which K indicating the number of sampling times is incremented by one.

Control proceeds to a step 630 wherein the condition of the brake sensor 55 read through the level input port 72 is checked and a decision is made if the vehicle is on braking operation. When the brake pedal is still operated, that is, it is on braking operation, the operational flow returns to the step 500 and the above-mentioned steps are repeated. When the brake pedal has been released, this routine is terminated.

According to this embodiment thus arranged, since the dead time of the system controlling the braking hydraulic pressure of the braking device 11 is approximated or estimated by the observer, it is possible to control the angular velocity $\omega$ of the wheel 1 such that it is equal to the target angular velocity $\omega^*$ without causing the excessive control due to the dead time, resulting in maintaining the drive feeling and stopping the vehicle with a minimal braking distance.

FIG. 20 is a graph showing the control of the angular velocity of the wheel 1 until the vehicle is stopped after the braking operation is started. Until the vehicle is stopped, the target angular velocity $\omega$ (indicated by dashed line) is decreased as ramp function. According to the brake control system of this embodiment, the actual angular velocity $\omega$ of the wheel 1 (indicated by solid line) immediately follows up the target angular velocity $\omega^*$ after overshoot and undershoot slightly occur. On the other hand, the conventional system causes a hunting due to the delay in the hydraulic pressure system such as delay of operation of the solenoid-operated valves, and therefore the angular velocity pa (indicated by broken line) cannot be equal to the target angular velocity for a long time. Furthermore, the conventional control causes the turbulence of control, indicated by I in FIG. 20, because it is difficult to estimate the vehicle speed where the control of the wheel angular velocity is stably performed. This problem is eliminated according to this embodiment. In addition, in the conventional system shown in the figure, the drive feeling is taken in serious consideration as compared with the braking characteristics, and therefore the braking distance is longer as compared with the system according to the present embodiment. It is understood from the figure that the present embodiment results in extremely excellent characteristics in response and stability. Furthermore, according to the present embodiment, since the brake of the wheel 1 can be stably controlled irrespective of variations of the friction coefficient in wide range ($\mu=0.7\pm0.4$), the slip ratio can be stably controlled even if the vehicle runs the road surface on which the friction coefficient is rapidly varied or the road on which the friction coefficient is defferent with respect to the right and left wheels, resulting in maintaining high braking characteristics.

It should be understood that the foregoing relates to only preferred embodiments of the invention, and that it is intended to cover all changes and modifications of the embodiments of the invention herein used for the purpose of the disclosure, which do not constitute departures from the spirit and scope of the invention.

What is claimed is:

1. A system for controlling a brake of a vehicle, comprising:
   vehicle speed detecting means for detecting a speed of said vehicle;
   rotational speed detecting means for detecting a rotational speed of a wheel of said vehicle;
   braking pressure adjusting means for adjusting a braking pressure transferred to a braking device for braking said wheel;
   slip ratio setting means for setting a slip ratio of said wheel in accordance with an operating amount of a brake pedal of said vehicle;
   target rotational speed setting means for setting a target rotational speed for said wheel on the basis of the set slip ratio and the detected vehicle speed; and
   brake controlling means for controlling said braking pressure adjusting means so that the detected rotatioal speed of said wheel becomes equal to the set target rotational speed, said brake controlling means including integral-added optimal regulator means for determining an optimal feedback gain that is determined in accordance with a dynamic mole of a system relating to a braking operation of said vehicle, and for determining a braking pressure to said braking member on the basis of said optimal feedback gain, said integral-added optimal regulator comprising:
   (a) a state observer for obtaining parameter determined in accordance with said dynamic model of the system and for estimating state variables of an appropriate order indicative of a dynamic internal state of the system on the basis of the detected rotational speed of said wheel detected by said rotational speed detecting means, the braking pressure of said braking device determined by said brake controlling means, and said parameters determined in accordance with the dynamic model of the system;
   (b) an accumulating unit for obtaining a deviation of the rotational speed of said wheel detected by said rotational speed detecting means from the target rotational speed set by said target rotational speed detecting means, and for calculating an integrated value of the obtained deviation; and
   (c) a braking pressure determining unit for determining a braking pressure to said braking device on the basis of the estimated state variables, the calculated integrated value, and the determined optimal feedback gain, and controlling the brake based on said determining.

2. A system for controlling a brake of a vehicle, comprising:
   braking pressure adjusting means for adjusting a braking pressure transferred through a hydraulic pressure system to a braking device for braking a wheel of said vehicle;
   wheel speed detecting means for detecting a wheel speed of said wheel;
   vehicle speed detecting means for detecting a speed of said vehicle; and
   control means for determining a target wheel speed on the basis of the detected vehicle speed and for controlling said braking pressure adjusting means using a feedback control so that the detected wheel speed is equal to the determined target wheel speed, said control means having state variable determining means for determining state variables representing the internal state of a system performing the brake of said wheel including a variable corresponding to a dead time on control of said hydraulic pressure system, and said control means including integral-added optimal regulator means for acquiring an optimal feedback gain in accordance with a dynamic model of a system for performing braking of said wheel and for performing said feedback control by determining a control amount for said braking pressure adjusting means on the basis of the detected wheel speed, the determined target wheel speed, the determined state variables, and said optimal feedback gain.

3. A system as claimed in claim 2, wherein said state variable determining means includes means for estimating the state variable corresponding to the dead time on the basis of a control output to said braking pressure adjusting means and an actual controlled amount and means for determining a braking pressure of said hydraulic pressure system based on the state variables, and wherein said integral-added optimal regulator means comprises an accumulating unit for integrating the difference between the detected wheel speed and the determined target wheel speed and for integrating the integrated value, and a feedback amount determining unit for determining a control amount for braking pressure on the basis of the predetermined feedback gain, the determined state variables, the integrated values, the detected wheel speed, and the determined target wheel speed.

4. A system for controlling a brake of a vehicle, comprising:
   braking pressure adjusting means for adjusting a braking pressure transferred through a hydraulic pressure system to a braking device, for braking a wheel of said vehicle;
   slip ratio detecting means for detecting a slip ratio of said wheel of said vehicle;
   target slip ratio setting means for setting a slip ratio of said wheel so as to maximize a friction force between said wheel and a road surface; and
   brake controlling means for controlling said braking pressure adjusting means using a feedback control so that the detected slip ratio of said wheel becomes equal to the set target slip ratio, said brake controlling means including state variable determining means for determining state variables representing an internal state of a system performing the braking of said wheel including a variable corresponding to a dead time on control of said hydraulic pressure system, and said brake controlling means including an integral-added optimal regulator means for acquiring an optimal feedback gain in accordance with a dynamic model of a system performing the braking of said wheel and for performing the feedback control by determining a control amount for said braking pressure adjusting means on the basis of the detected slip ratio, the determined state variables, and said optimal feedback gain.

5. A system as claimed in claim 4, wherein said state variable determining means includes means for estimating the state variable corresponding to the dead time on the basis of a control output to said braking pressure adjusting means and actually controlled amount and means for determining a braking pressure of said hydraulic pressure system based on the state variables, and wherein said integral-added optimal regulator means comprises an accumulating unit for accumulating the difference between the detected slip ratio and the set target slip ratio and a feedback amount determining unit for determining a control amount for braking pressure on the basis of the determined feedback gain, the determined state variables, the accumulated value, and the detected slip ratio.

6. A system for controlling a brake of a vehicle comprising:
   rotational speed detecting means for detecting a rotational speed of a wheel of said vehicle;
   target rotational speed setting means for setting a target rotational speed for said wheel;
   braking pressure adjusting means for adjusting a braking pressure supplied to a braking device for braking said wheel, in accordance with a drive signal; and
   brake control means for controlling said braking pressure adjusting means so that the detected rotational speed of said wheel becomes equal to the target rotational speed set by said target rotational speed setting means, said brake control means including:
   (a) state observer means for determining parameters determined in accordance with a dynamic model of the system which is predetermined through system identification, for estimating state variable of an appropriate order indicative of a dynamic internal state of the system, and for performing brake control of said vehicle on the basis of the wheel rotational speed detected by the rotational speed detecting means, the previous braking pressure of said braking device determined by said brake control means, and said determined parameters;
   accumulatng means for obtaining a deviation of the rotational speed detected by said wheel rotational speed detecting means from said target rotational speed set by said target rotational speed setting means and for calculating an integrated value of the obtained deviation;
   braking pressure determining means for obtaining a predetermined optimal feed back gain, predetermined in accordance with said dynamic model and for obtaining a braking pressure to be supplied to said braking device on the basis of the estimated state variables, the calculated integrated value, and said optimal feedback gain and for generating a control signal indicative of the obtained braking pressure; and
   drive signal generating means resposive to the control signal from said braking pressure determining means for generating said drive signal and supplying the generated drive signal to said braking pressure adjusting means.

7. A system as claimed in claim 6, wherein said target rotational speed setting means comprises slip ratio determining means for determining a slip ratio of said wheel on the basis of a braking amount of said vehicle determined by a vehicle driver, vehicle speed detecting means for detecting a vehicle speed of said vehicle, and target rotational speed determinining means for determining the target rotational speed on the basis of the determined slip ratio and the detected vehicle speed.

8. A system for controlling a brake of a vehicle, comprising:
   braking pressure adjusting means for adjusting a braking pressure supplied to a braking device for braking a wheel of said vehicle, the braking pressure based on a braking operation of a vehicle driver and being adjusted in accordance with a pressure control signal;
   slip ratio detecting means for detecting a slip ratio of said wheel; and
   brake control means for generating said pressure control signal to control said braking pressure adjusting means so that the detected slip ratio becomes equal to a target slip ratio, said brake control means comprising:
   (a) state observer means for estimating state variables indicative of an internal state of the brake control system, the state variables including a variable representing at least the control dead time of said braking pressure adjusting means;
   (b) accumulating means for accumulating a deviation between the target slip ratio and the detected slip ratio;
   (c) control amount determined means for determining a control amount on the basis of an optimal feedback gain determined in advance in accordance with a dynamic model of the system which is predetermined through system identification, the state variable estimated by said state observer means, the accumulated value obtained by the accumulating means, and the slip ratio detected by the slip ratio detecting means; and
   (d) pressure control signal generating means for generating said pressure control signal on the basis of the determined control amount and for supplying it to said braking pressure adjusting means.

9. A system as claimed in claim 8, wherein said state observer means includes means for estimating said state variables on the basis of the control amount determined by said control amount determining means.

10. A system as claimed in claim 8, further comprising braking pressure detecting means for detecting the braking pressure supplied to said braking device, and wherein said state observer means includes means for estimating the state variables on the basis of the control amount determined by said control amount determining means and the braking pressure detected by said braking pressure detecting means.

11. A system as claimed in claim 8, further comprising braking pressure detecting means for detecting the braking pressure supplied to said braking device, and wherein said control amount determining means determines the control amount on the basis of the determined optimal feedback gain, the estimated state variables, the accumulated value, the detected slip ratio, and the detected braking pressure.

12. A system for controlling a brake of a vehicle, comprising:
   braking pressure adjusting means for adjusting a braking pressure supplied to a braking device for braking a wheel of said vehicle, the braking pressure being based on a braking operation of a vehicle driver and being adjusted in accordance with a pressure control signal;
   rotational angular velocity detecting means for detecting a rotational angular velocity of said wheel;
   vehicle speed detecting means for detecting a speed of said vehicle; and
   brake control means for calculating a target rotational angular velocity on the basis of the detected vehicle speed and for controlling said braking pressure adjusting means so that the detected rotational angular velocity vecomes equal to the calculated target rotational angular velocity, said brake control means including:

(a) state observer means for estimating state variables indicative of an internal state of the brake control system, the state variables including a variable representing at least the control dead time of said braking pressure adjusting means;

(b) accumulating means for integrating a deviation between the target rotational angular velocity and the detected rotational angular velocity;

(c) control amount determining means for determining a control amount on the basis of a optimal feedback gain determined in advance in accordance with a dynamic model of the system which is predetermined through system identification, the state variables estimated by said state observer means, the value obtained by the accumulating means, the calculated target rotational angular velocity, and the detected rotational angular velocity; and (d) pressure control signal generating means for generating said pressure control signal on the basis of the determined control amount and for supplying it to said braking pressure adjusting means.

13. A system as claimed in claim 12, wherein said state observer means includes means for estimating the state variables on the basis of the determined control amount.

14. A system as claimed in claim 12, further comprising braking pressure detecting means for detecting the braking pressure supplied to said braking device, and wherein said state observer means includes means for estimating the state variables on the basis of the control amount determined by said control amount determining means and the braking pressure detected by said braking pressure detecting means.

15. A system as claimed in claim 12, wherein said accumulating means includes means for calculating first and second order integrals of the deviation therebetween, and said control amount determining means includes means for determining the control amount on the basis of the estimated state variables, the integrated values, the calculated target rotational angular velocity, and the detected rotational angular velocity.

16. A system as claimed in claim 15, further comprising braking pressure detecting means for detecting the braking pressure supplied to said braking device, and wherein said state observer means includes means for estimating the state variables on the basis of the control amount determined by said control amount determining means and the braking pressure detected by said braking pressure detecting means.

17. A system as claimed in claim 16, wherein said control amount determining means includes means for determining the control amount on the basis of the estimated state variables, the integrated values, the calculated target rotational angular velocity, the detected rotational angular velocity, and the detected braking pressure.

* * * * *